(12) United States Patent
Das et al.

(10) Patent No.: US 12,279,216 B2
(45) Date of Patent: Apr. 15, 2025

(54) SIDELINK SYNCHRONIZATION SOURCE SELECTION

(71) Applicant: QUALCOMM Incorporated, San Diego, CA (US)

(72) Inventors: Soumya Das, San Diego, CA (US); Mohammad Nekoui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 17/696,642

(22) Filed: Mar. 16, 2022

(65) Prior Publication Data
US 2023/0319739 A1    Oct. 5, 2023

(51) Int. Cl.
*H04W 56/00* (2009.01)
*H04W 64/00* (2009.01)

(52) U.S. Cl.
CPC ..... *H04W 56/001* (2013.01); *H04W 56/0015* (2013.01); *H04W 64/00* (2013.01)

(58) Field of Classification Search
CPC ........................ H04W 56/001; H04W 56/0015; H04W 64/00
See application file for complete search history.

(56) References Cited

U.S. PATENT DOCUMENTS

| | | | |
|---|---|---|---|
| 11,444,668 B2 * | 9/2022 | Badic | G01S 19/01 |
| 2017/0142741 A1 * | 5/2017 | Kaur | H04W 76/14 |
| 2021/0377893 A1 | 12/2021 | Khoryaev et al. | |
| 2023/0319739 A1 * | 10/2023 | Das | H04W 56/001 370/350 |
| 2024/0056997 A1 * | 2/2024 | Hoang | H04W 64/00 |

FOREIGN PATENT DOCUMENTS

| | | |
|---|---|---|
| WO | 2021240478 A1 | 12/2021 |
| WO | 2022034483 A2 | 2/2022 |

OTHER PUBLICATIONS

International Search Report and Written Opinion—PCT/US2023/013429—ISA/EPO—May 19, 2023.

* cited by examiner

*Primary Examiner* — Raj Jain
(74) *Attorney, Agent, or Firm* — QUALCOMM Incorporated

(57) ABSTRACT

Systems and techniques are described for sidelink synchronization source selection. For example, a method for wireless communications at a user equipment (UE) may include transmitting, from the UE to a target UE, a message including information associated with a first synchronization reference source associated with the UE. The method may include receiving, at the UE from the target UE in response to the message, a response message including an indication of whether the target UE can use the first synchronization reference source for sidelink positioning. The method can further include determining, at the UE based on the response message, whether to use the first synchronization reference source or a different synchronization reference source as a master synchronization reference source for the sidelink positioning.

27 Claims, 19 Drawing Sheets

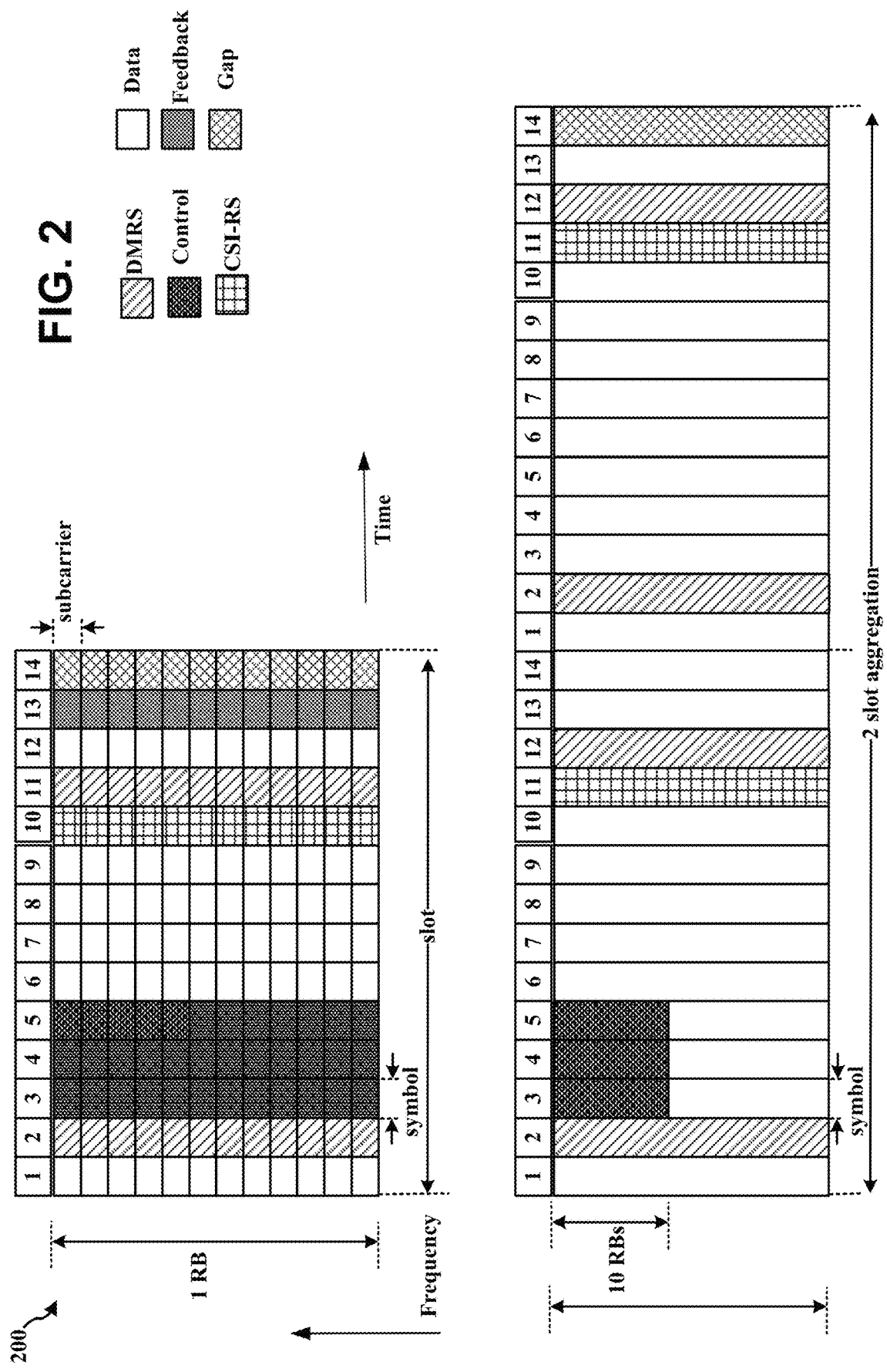

| GNSS-based synchronization – Case 1 | GNSS-based synchronization – Case 2 | eNB-based synchronization |
|---|---|---|
| 1310 | 1320 | 1330 |
| P0: GNSS | P0: GNSS | P0': eNB |
| P1: UE directly synchronized to GNSS | P1: UE directly synchronized to GNSS | P1': UE directly synchronized to eNB |
| P2: UE indirectly synchronized to GNSS | P2: UE indirectly synchronized to GNSS | P2': UE indirectly synchronized to eNB |
| P6: The remaining UEs have the lowest priority | P3: eNB | P3': GNSS |
| P7: UE's own internal clock | P4: UE directly synchronized to eNB | P4': UE directly synchronized to GNSS |
|  | P5: UE indirectly synchronized to eNB | P5': UE indirectly synchronized to GNSS |
|  | P6: the remaining UEs have the lowest priority | P6': the remaining UEs have the lowest priority. |
|  | P7: UE's own internal clock | P7': UE's own internal clock |

FIG. 13

SIDELINK SYNCHRONIZATION SOURCE SELECTION

FIELD

The present disclosure relates generally to communication systems. For example, aspects of the present disclosure relate to a configuration for providing sidelink synchronization source selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in user equipment (UE), vehicle-to-everything (V2X), vehicle-to-vehicle (V2V), and/or device-to-device (D2D) communications.

There exists a need for further improvements in synchronization for devices in wireless communications systems (e.g., for UEs, vehicles, etc.). These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for sidelink PRS-driven synchronization source selection for vehicle-based communications (e.g., C-V2X communications). According to at least one example, a method for wireless communications at a at a user equipment (UE) is provided. The method includes: transmitting, from the UE to a target UE, a message including information associated with a first synchronization reference source associated with the UE: receiving, at the UE from the target UE in response to the message, a response message including an indication of whether the target UE can use the first synchronization reference source for sidelink positioning; and determining, at the UE based on the response message, whether to use the first synchronization reference source or a different synchronization reference source as a master synchronization reference source for the sidelink positioning.

In another example, an apparatus for wireless communications is provided that includes at least one memory (e.g., configured to store data, such as virtual content data, one or more images, etc.) and at least one processor (e.g., implemented in circuitry) coupled to the at least one memory. The at least one processor is configured to and can: transmit, to a target UE, a message including information associated with a first synchronization reference source associated with the apparatus: receive, from the target UE in response to the message, a response message including an indication of whether the target UE can use the first synchronization reference source for sidelink positioning; and determine, at the UE based on the response message, whether to use the first synchronization reference source or a different synchronization reference source as a master synchronization reference source for the sidelink positioning.

In another example, a non-transitory computer-readable medium of a user equipment (UE) is provided that has stored thereon instructions that, when executed by one or more processors, cause the one or more processors to: transmit, to a target UE, a message including information associated with a first synchronization reference source associated with the UE: receive, from the target UE in response to the message, a response message including an indication of whether the target UE can use the first synchronization reference source for sidelink positioning; and determine, based on the response message, whether to use the first synchronization reference source or a different synchronization reference source as a master synchronization reference source for the sidelink positioning.

In another example, an apparatus for wireless communications is provided. The apparatus includes: means for transmitting, to a target UE, a message including information associated with a first synchronization reference source associated with the apparatus: means for receiving, at the UE from the target UE in response to the message, a response message including an indication of whether the target UE can use the first synchronization reference source for sidelink positioning; and means for determining, based on the response message, whether to use the first synchronization reference source or a different synchronization reference source as a master synchronization reference source for the sidelink positioning.

In some aspects, the apparatus is, or is part of, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle (e.g., an automobile or truck), a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 2 illustrate example aspects of a sidelink slot structure, in accordance with some aspects of the present disclosure.

FIG. 13 is a table of example priorities for synchronization references for sidelink synchronization source selection for vehicle-based communications (e.g., C-V2X communications), in accordance with some aspects of the present disclosure.

DETAILED DESCRIPTION

Figure 1:
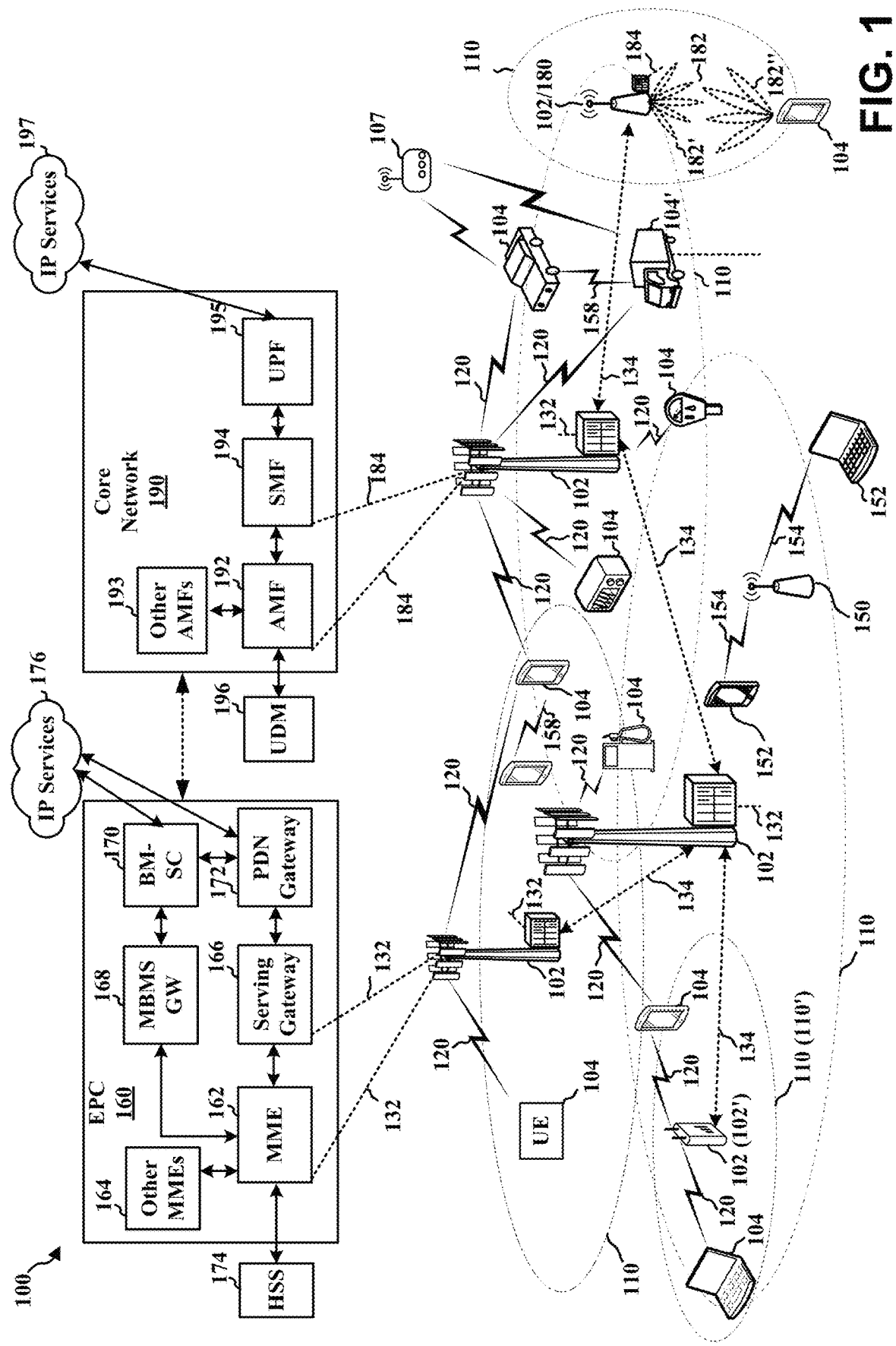
FIG. 1 is a diagram illustrating an example of a wireless communications system and an access network, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A 5G mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of devices or systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), and vehicle-to-pedestrian (V2P) communications, which are all collectively referred to as vehicle-to-everything (V2X) communications. V2X is a vehicular communication system that supports the wireless transfer of information from a vehicle to other entities (e.g., other vehicles, pedestrians with smart phones, road side units (RSUs), and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, and/or traffic infrastructure. The information may be transmitted using one or more vehicle-based messages, such as C-V2X messages, which can include Sensor Data Sharing Messages (SDSMs), Basic Safety Messages (BSMs), Cooperative Awareness Messages (CAMs), Collective Perception Messages (CPMs), and/or other type of message. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming potential road dangers (e.g., unforeseen oncoming vehicles, accidents, and road conditions) from the other vehicles. Vehicle-based messages (e.g., SDSMs, BSMs, CAMs, and CPMs) are beneficial because they can provide an awareness and understanding to the vehicles of the upcoming potential road dangers.

The IEEE 802.11p Standard supports uses a dedicated short-range communications (DSRC) interface for V2X wireless communications. Characteristics of the IEEE 802.11p based DSRC interface include low latency and the use of the unlicensed 5.9 Gigahertz (GHz) frequency band. Cellular V2X (C-V2X) was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band.

C-V2X promotes automated driving and enhances the traffic experience. The connection between cars, the infrastructure, the network, and pedestrians enables a much more efficient and safer transport system. C-V2X serves as a foundation for vehicles to communicate with each other and everything around them. One fundamental element in C-V2X is positioning, namely extracting the vehicle's absolute and relative positions concerning other objects, such as buildings, pedestrians, traffic signs, and other vehicles.

With the evolution of C-V2X services from assisted driving to automated driving, the use case requirements are also changing in terms of the availability of network coverage, level of uncertainty, availability of features for simultaneous localization and mapping-based positioning techniques, reliability, latency, speed, data rate, communication range, as well as positioning accuracy, which is changing from meter level to sub-meter level. Different from other services, positioning information is one of the essentials to help guarantee the safety of vehicles.

Positioning information is one of the key components in C-V2X services and is indispensable to C-V2X use cases. Generally, there are three kinds of services included within C-V2X, which include traffic safety, traffic efficiency, and information services. The C-V2X services may include various different C-V2X use cases, which may include, but are not limited to, assisted driving, automated driving, traffic monitoring and management, autonomous parking, an emergency brake warning, a pre-crash sensing warning, a road hazard warning, a congestion alert, speed guidance, automated driving, and remote driving.

The different C-V2X services and use cases have different positioning accuracy requirements, which are involved with the service level key performance indicators (KPIs) for positioning. For example, the positioning accuracy requirement for remote driving may be 0.1 meters (m), while the positioning accuracy requirement for in-vehicle entertainment may be 30 m. Position accuracy describes the closeness of the measured position of a vehicle to its true position value. The accuracy can describe the accuracy either as an absolute position or a relative position of the vehicle, and can be further derived into a horizontal position accuracy (e.g., referring to the position error in a two-dimensional reference or horizontal plane) and into a vertical position accuracy (e.g., referring to the position error on the vertical axis or altitude).

For positioning accuracy of vehicles, C-V2X (e.g., the C-V2X access layer) requires stringent (tight) time and frequency synchronization to provide for lane level and sub-lane level accurate positioning for many C-V2X applications. Whenever Global Navigation Satellite System (GNSS) coverage is available, C-V2X utilizes GNSS for both time synchronization and positioning. GNSS uses satellites to extract real-time, exact, fast, and continuous three-dimensional position location, velocity information, and/or timing information.

However, in GNSS-challenged environments (such as in tunnels, canyons, dense urban areas, or underground parking garages), C-V2X relies on other synchronization sources, such as sidelink synchronization signals (SLSS), and relies on other positioning techniques, such as sidelink positioning, which is a candidate for Release 18 of 3GPP.

Sidelink positioning utilizes a round-trip time (RTT) measurement of a wideband signal (e.g., a positioning reference signal). For example, when two vehicles (e.g., two UEs) desire to position themselves with respect to one another, the vehicles each transmit a wideband signal (e.g., a wideband signal, such as 100 Megahertz in width, within an unlicensed frequency spectrum) and each measure the RTT of their respective transmitted signal. From the measured RTT, each of the vehicles can determine their distance from one another and position themselves accordingly. However, since the signal utilized for the RTT measurement is a wideband signal, a stringent (tight) synchronization is required between the two vehicles to achieve an accurate positioning.

It should be noted that although the synchronization (e.g., utilizing SLSS) between the two vehicles may be sufficient for their communications purposes, the synchronization (e.g., utilizing SLSS) between the two vehicles may not be sufficient for their positioning purposes to be able to meet the positioning accuracy requirements. For example, many C-V2X use cases require positioning with a sub-lane accuracy (e.g., less than one (1) m of accuracy), which requires a very stringent (tight) synchronization between the vehicles.

In some aspects of the present disclosure, systems, apparatuses, methods (also referred to as processes), and computer-readable media (collectively referred to herein as "systems and techniques") are described herein for providing sidelink synchronization reference source selection for positioning and/or communications purposes. In some cases, the sidelink synchronization reference source selection is sidelink reference signal-driven (e.g., positioning reference signal (PRS)-driven, sounding reference signal (SRS)-driven, or driven by other types of reference signals). A sidelink synchronization reference source can also be referred to herein as a synchronization source or a synchronization reference.

In some aspects, the sidelink synchronization reference source selection is performed for vehicle-based communications (e.g., C-V2X communications). For instance, in some cases, the systems and techniques provide a solution for selecting optimum synchronization sources (e.g., synchronization references) for vehicles (e.g., UEs) to provide stringent (tight) synchronization between the vehicles for positioning purposes. In one or more examples, one or more synchronization sources may be selected to provide synchronization between the vehicles for both communications and positioning purposes (e.g., UE 1 may be selected as a synchronization source for a vehicle for both communications and positioning purposes). In other examples, different synchronization sources may be selected to provide synchronization between the vehicles for communications purposes and positioning purposes (e.g., UE 1 may be selected as a synchronization source for a vehicle for communications purposes, and UE 2 may be selected as a synchronization source for the vehicle for positioning purposes).

In some aspects, during an initial period when UEs (e.g., vehicles, RSUs, network-connected infrastructure, etc.) are exchanging messages or information for positioning purposes (e.g., during a pre-PRS handshake), the UEs may include information regarding synchronization sources of the UEs. For example, the information regarding a synchronization source may include an address (e.g., a Layer 2 or L2 address) of the SyncRef UE and/or a priority of the synchronization source. Depending on the synchronization sources of the UEs, the synchronization sources of the UEs may be updated, such as for the particular PRS session (e.g., for determining range and position using the PRS signals). For instance, the UEs can negotiate to use the same UE as a synchronization source. In one example, if a first UE has access to more than one synchronization source having a same priority and the first UE selects a synchronization source that is different from a synchronization source associated with a second UE, the first and second UEs can agree to use the same synchronization source if the synchronization source is detectable by (e.g., within communication of) both UEs. If this is not possible, then one of the UEs can become the synchronization source and other UE can use the selected UE as the synchronization source. The UE that will become the synchronization source UE can be negotiated as part of handshake (e.g., a pre-PRS handshake).

Additional aspects of the present disclosure are described in more detail below.

As used herein, the terms "user equipment" (UE) and "network entity." are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHZ and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR. LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 illustrates one, non-limiting example of a frame structure that may be used. Aspects described herein may be applied to communication using other, different frame formats.

Figure 3A:
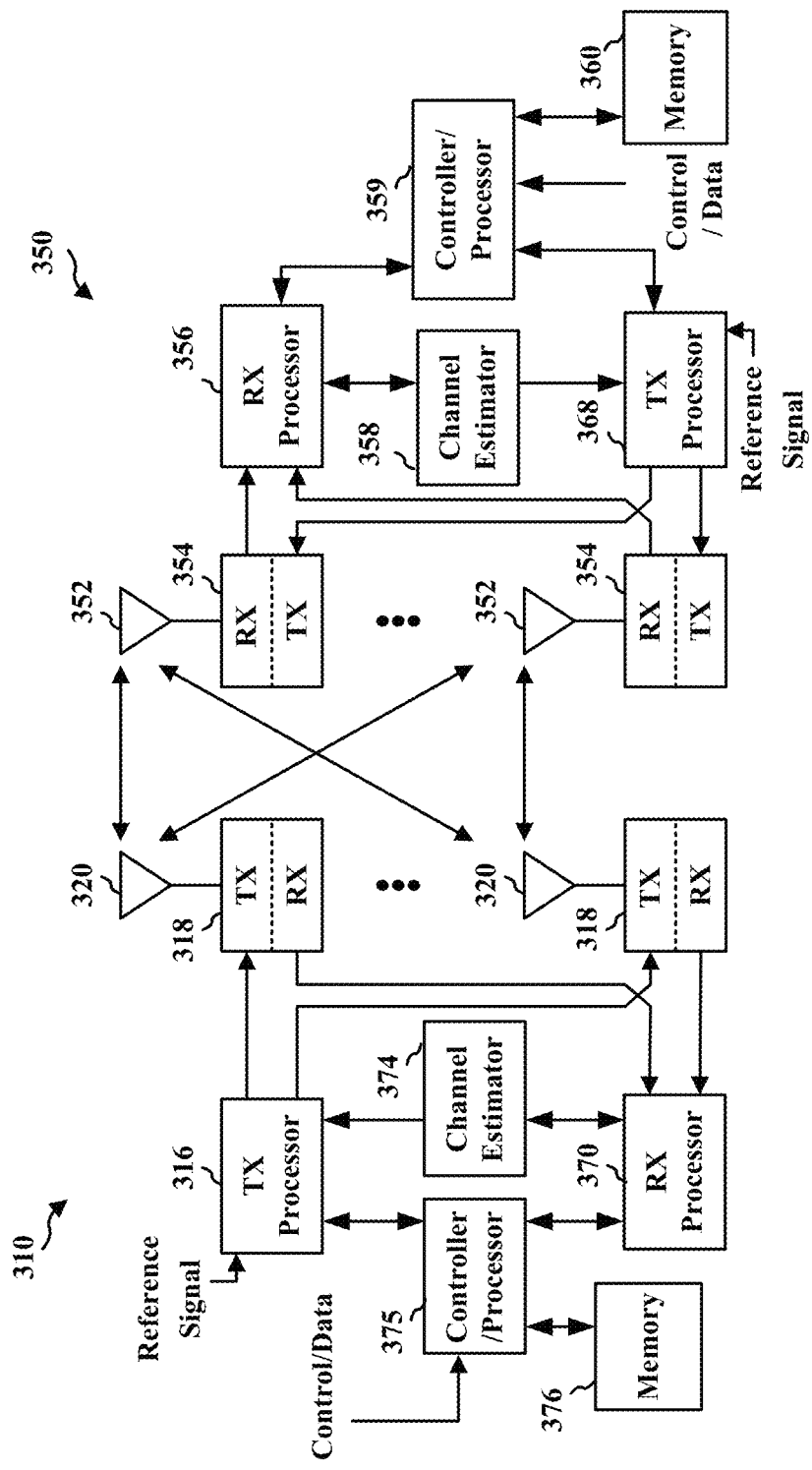
FIG. 3A is a diagram illustrating an example of a first device and a second device involved in wireless communications (e.g., V2V communications, V2X communications, and/or other device-to-device communication), in accordance with some aspects of the present disclosure.

FIG. 3A is a block diagram of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, a vehicle, etc. The receiving device 350 may comprise a UE, an RSU, a vehicle, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described herein.

Figure 3B:
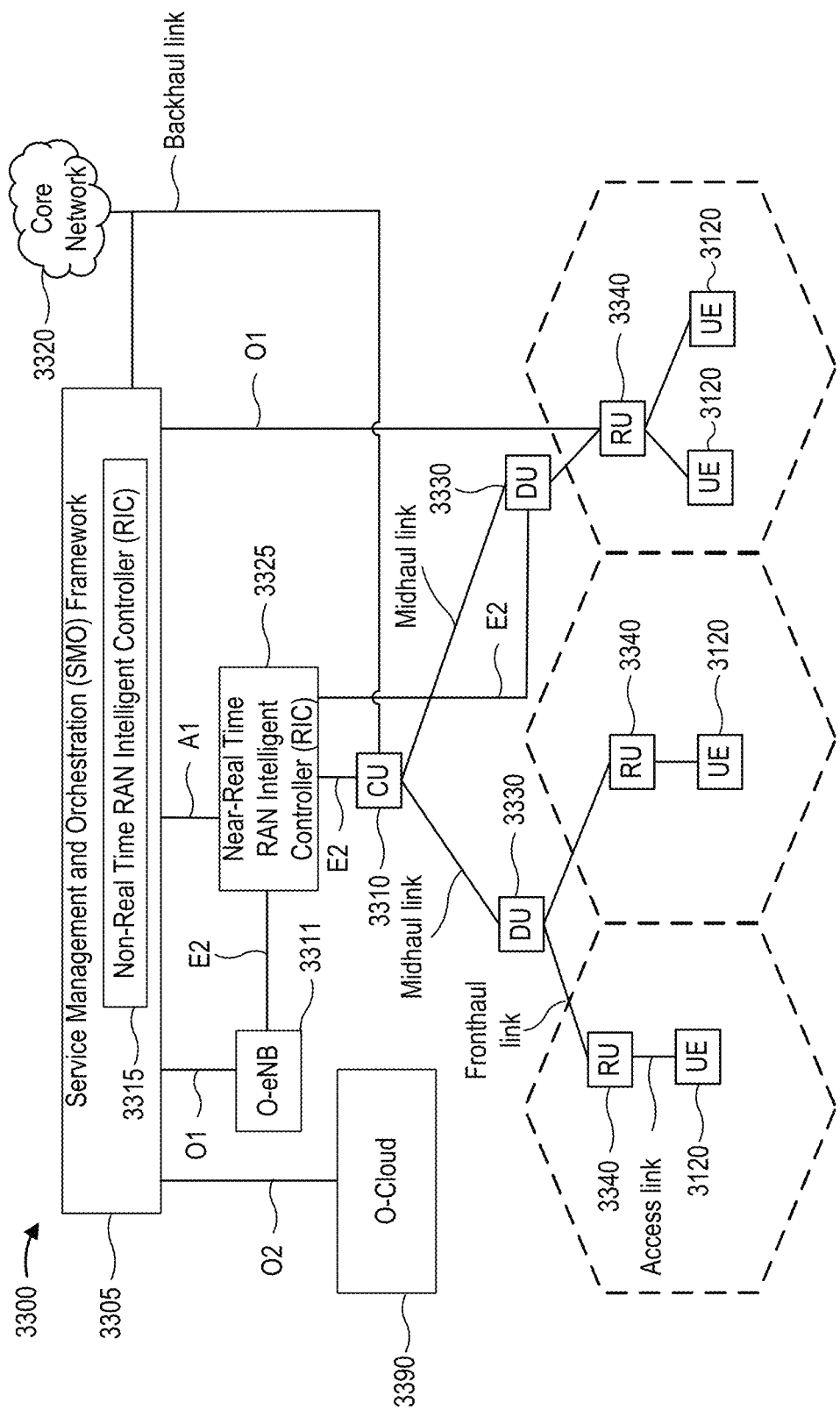
FIG. 3B is a diagram illustrating an example of a disaggregated base station architecture, which may be employed by the disclosed system for sidelink PRS-driven synchronization source selection for vehicle-based communications (e.g., C-V2X communications), in accordance with some examples.

FIG. 3B is a diagram illustrating an example of a disaggregated base station 3300 architecture, which may be employed by the disclosed system for sidelink PRS-driven synchronization source selection for vehicle-based communications (e.g., C-V2X communications), in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 3B shows a diagram illustrating an example disaggregated base station 3300 architecture. The disaggregated base station 3300 architecture may include one or more central units (CUs) 3310 that can communicate directly with a core network 3320 via a backhaul link, or indirectly with the core network 3320 through one or more disaggregated base station units (such as a Near-Real Time (Near-RT) RAN Intelligent Controller (RIC) 3325 via an E2 link, or a Non-Real Time (Non-RT) RIC 3315 associated with a Service Management and Orchestration (SMO) Framework 3305, or both). A CU 3310 may communicate with one or more distributed units (DUs) 3330 via respective midhaul links, such as an F1 interface. The DUs 3330 may communicate with one or more radio units (RUs) 3340 via respective fronthaul links. The RUs 3340 may communicate with respective UEs 3120 via one or more RF access links. In some implementations, the UE 3120 may be simultaneously served by multiple RUs 3340.

Each of the units, i.e., the CUS 3310, the DUs 3330, the RUs 3340, as well as the Near-RT RICs 3325, the Non-RT RICs 3315 and the SMO Framework 3305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 3310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 3310. The CU 3310 may be configured to handle user plane functionality (i.e., Central Unit-User Plane (CU-UP)), control plane functionality (i.e., Central Unit-Control Plane (CU-CP)), or a combination thereof. In some implementations, the CU 3310 can be logically split into one or more CU-UP units and one or more CU-CP units. The CU-UP unit can communicate bidirectionally with the CU-CP unit via an interface, such as the E1 interface when implemented in an O-RAN configuration. The CU 3310 can be implemented to communicate with the DU 3330, as necessary, for network control and signaling.

The DU 3330 may correspond to a logical unit that includes one or more base station functions to control the operation of one or more RUs 3340. In some aspects, the DU 3330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 3330 may further host one or more low PHY layers. Each layer (or module) can be implemented with an interface configured to communicate signals with other layers (and modules) hosted by the DU 3330, or with the control functions hosted by the CU 3310.

Lower-layer functionality can be implemented by one or more RUs 3340. In some deployments, an RU 3340, controlled by a DU 3330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 3340 can be implemented to handle over the air (OTA) communication with one or more UEs 3120. In some implementations, real-time and non-real-time aspects of control and user plane communication with the RU(s) 3340 can be controlled by the corresponding DU 3330. In some scenarios, this configuration can enable the DU(s) 3330 and the CU 3310 to be implemented in a cloud-based RAN architecture, such as a vRAN architecture.

The SMO Framework 3305 may be configured to support RAN deployment and provisioning of non-virtualized and virtualized network elements. For non-virtualized network elements, the SMO Framework 3305 may be configured to support the deployment of dedicated physical resources for RAN coverage requirements which may be managed via an operations and maintenance interface (such as an O1 interface). For virtualized network elements, the SMO Framework 3305 may be configured to interact with a cloud computing platform (such as an open cloud (O-Cloud) 3390) to perform network element life cycle management (such as to instantiate virtualized network elements) via a cloud computing platform interface (such as an O2 interface). Such virtualized network elements can include, but are not limited to, CUs 3310, DUs 3330, RUs 3340 and Near-RT RICs 3325. In some implementations, the SMO Framework 3305 can communicate with a hardware aspect of a 4G RAN, such as an open eNB (O-eNB) 3311, via an O1 interface. Additionally, in some implementations, the SMO Framework 3305 can communicate directly with one or more RUs 3340 via an O1 interface. The SMO Framework 3305 also may include a Non-RT RIC 3315 configured to support functionality of the SMO Framework 3305.

The Non-RT RIC 3315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 3325. The Non-RT RIC 3315 may be coupled to or communicate with (such as via an A1 interface) the Near-RT RIC 3325. The Near-RT RIC 3325 may be configured to include a logical function that enables near-real-time control and optimization of RAN elements and resources via data collection and actions over an interface (such as via an E2 interface) connecting one or more CUs 3310, one or more DUs 3330, or both, as well as an O-eNB, with the Near-RT RIC 3325.

In some implementations, to generate AI/ML models to be deployed in the Near-RT RIC 3325, the Non-RT RIC 3315 may receive parameters or external enrichment information from external servers. Such information may be utilized by the Near-RT RIC 3325 and may be received at the SMO Framework 3305 or the Non-RT RIC 3315 from non-network data sources or from network functions. In some examples, the Non-RT RIC 3315 or the Near-RT RIC 3325 may be configured to tune RAN behavior or performance. For example, the Non-RT RIC 3315 may monitor long-term trends and patterns for performance and employ AI/ML models to perform corrective actions through the SMO Framework 3305 (such as reconfiguration via 01) or via creation of RAN management policies (such as A1 policies).

Figure 4:
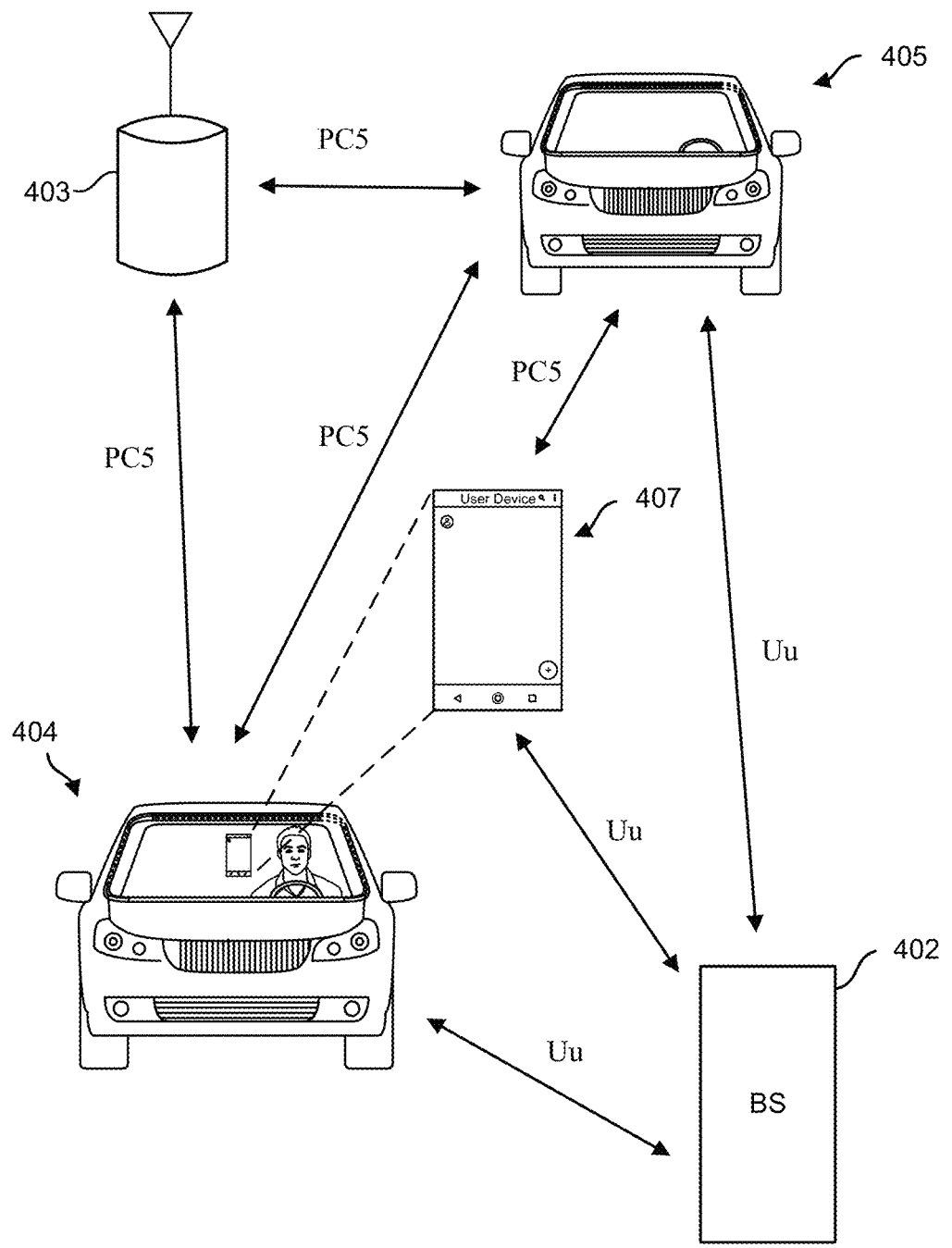
FIG. 4 is a diagram illustrating an example of various user equipment (UEs) communicating over direct communication interfaces (e.g., a cellular based PC5 sidelink interface, 802.11p defined Dedicated Short Range Communication (DSRC) interface, or other direct interface) and wide area network (Uu) interfaces, in accordance with some aspects of the present disclosure.

FIG. 4 illustrates examples of different communication mechanisms used by various UEs. In one example of sidelink communications, FIG. 4 illustrates a vehicle 404, a vehicle 405, and an RSU 403 communicating with each other using PC5, DSRC, or other device to device direct signaling interfaces. In addition, the vehicle 404 and the vehicle 405 may communicate with a base station 402 (shown as BS 402) using a network (Uu) interface. The base station 402 can include a gNB in some examples. FIG. 4 also illustrates a user device 407 communicating with the base station 402 using a network (Uu) interface. As described below, functionalities can be transferred from a vehicle (e.g., vehicle 404) to a user device (e.g., user device 407) based on one or more characteristics or factors (e.g., temperature, humidity, etc.). In one illustrative example, V2X functionality can be transitioned from the vehicle 404 to the user device 407, after which the user device 407 can communicate with other vehicles (e.g., vehicle 405) over a PC5 interface (or other device to device direct interface, such as a DSRC interface), as shown in FIG. 4.

While FIG. 4 illustrates a particular number of vehicles (e.g., two vehicles 404 and 405) communicating with each other and/or with RSU 403, BS 402, and/or user device 407, the present disclosure is not limited thereto. For instance, tens or hundreds of such vehicles may be communicating with one another and/or with RSU 403, BS 402, and/or user device 407. At any given point in time, each such vehicle, RSU 403, BS 402, and/or user device 407 may transmit various types of information as messages to other nearby vehicles resulting in each vehicle (e.g., vehicles 404 and/or 405), RSU 403, BS 402, and/or user device 407 receiving hundreds or thousands of messages from other nearby vehicles, RSUs, base stations, and/or other UEs per second.

While PC5 interfaces are shown in FIG. 4, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 5:
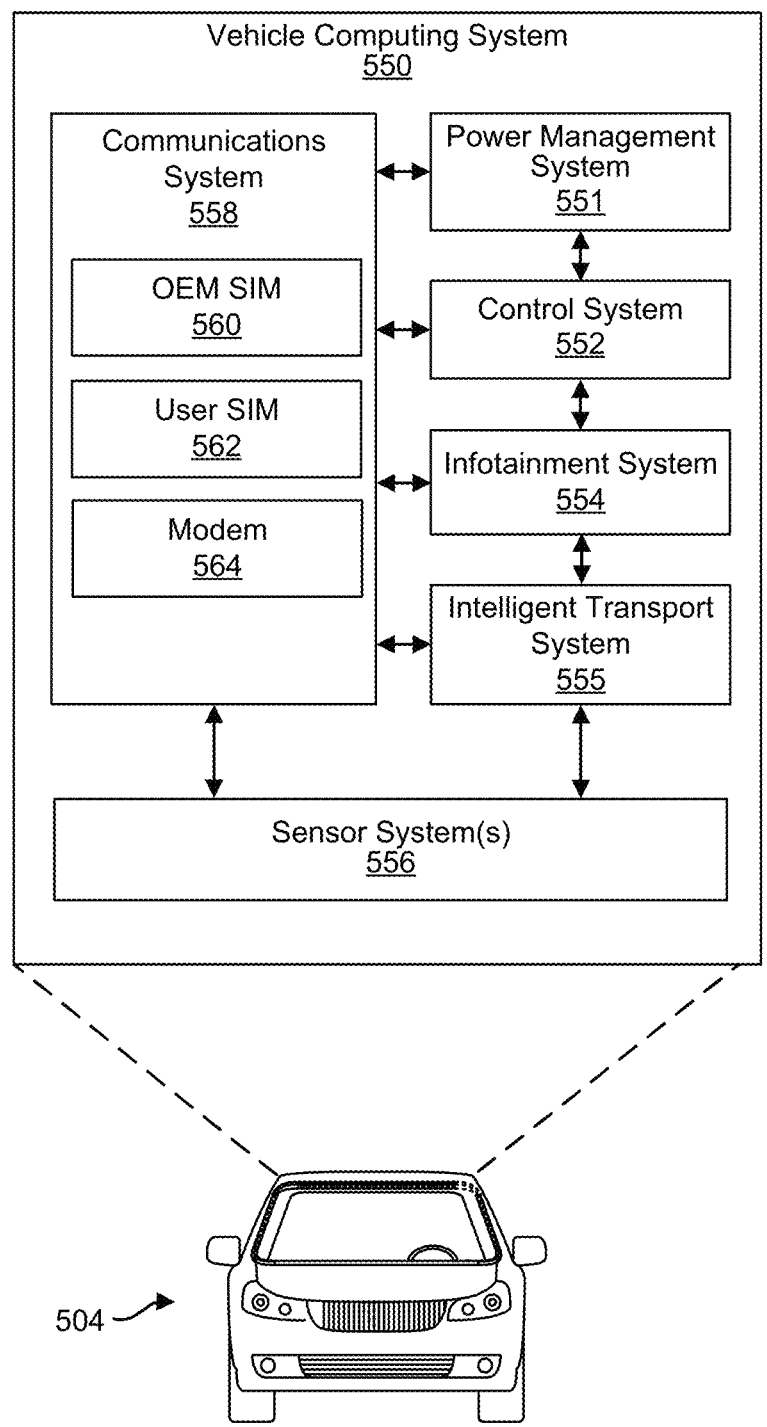
FIG. 5 is a block diagram illustrating an example of a computing system of a vehicle, in accordance with some aspects of the present disclosure.

FIG. 5 is a block diagram illustrating an example a vehicle computing system 550 of a vehicle 504. The vehicle 504 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 550 can include at least a power management system 551, a control system 552, an infotainment system 554, an intelligent transport system (ITS) 555, one or more sensor systems 556, and a communications system 558. In some cases, the vehicle computing system 550 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 552 can be configured to control one or more operations of the vehicle 504, the power management system 551, the computing system 550, the infotainment system 554, the ITS 555, and/or one or more other systems of the vehicle 504 (e.g., a braking system, a steering system, a safety system other than the ITS 555, a cabin system, and/or other system). In some examples, the control system 552 can include one or more electronic control units (ECUs). An ECU can control one or more of the electrical systems or subsystems in a vehicle. Examples of specific ECUs that can be included as part of the control system 552 include an engine control module (ECM), a powertrain control module (PCM), a transmission control module (TCM), a brake control module (BCM), a central control module (CCM), a central timing module (CTM), among others. In some cases, the control system 552 can receive sensor signals from the one or more sensor systems 556 and can communicate with other systems of the vehicle computing system 550 to operate the vehicle 504.

The vehicle computing system 550 also includes a power management system 551. In some implementations, the power management system 551 can include a power management integrated circuit (PMIC), a standby battery, and/or other components. In some cases, other systems of the vehicle computing system 550 can include one or more PMICs, batteries, and/or other components. The power management system 551 can perform power management functions for the vehicle 504, such as managing a power supply for the computing system 550 and/or other parts of the vehicle. For example, the power management system 551 can provide a stable power supply in view of power fluctuations, such as based on starting an engine of the vehicle. In another example, the power management system 551 can perform thermal monitoring operations, such as by checking ambient and/or transistor junction temperatures. In another example, the power management system 551 can perform certain functions based on detecting a certain temperature level, such as causing a cooling system (e.g., one or more fans, an air conditioning system, etc.) to cool certain components of the vehicle computing system 550 (e.g., the control system 552, such as one or more ECUs), shutting down certain functionalities of the vehicle computing system 550 (e.g., limiting the infotainment system 554, such as by shutting off one or more displays, disconnecting from a wireless network, etc.), among other functions.

The vehicle computing system 550 further includes a communications system 558. The communications system 558 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 558 is configured to transmit and receive information wirelessly over any suitable wireless network (e.g., a 3G network, 4G network, 5G network, WiFi network, Bluetooth™ network, and/or other network). The communications system 558 includes various components or devices used to perform the wireless communication functionalities, including an original equipment manufacturer (OEM) subscriber identity module (referred to as a SIM or SIM card) 560, a user SIM 562, and a modem 564. While the vehicle computing system 550 is shown as having two SIMs and one modem, the computing system 550 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 560 can be used by the communications system 558 for establishing a wireless connection for vehicle-based operations, such as for conducting emergency-calling (eCall) functions, communicating with a communications system of the vehicle manufacturer (e.g., for software updates, etc.), among other operations. The OEM SIM 560 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 562 can be used by the communications system 558 for performing wireless network access functions in order to support a user data connection (e.g., for conducting phone calls, messaging, Infotainment related services, among others). In some cases, a user device of a user can connect with the vehicle computing system 550 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 558 the vehicle, in which case the user device can cease performance of the wireless network access functionality (e.g., during the period in which the communications system 558 is performing the wireless access functionality). The communications system 558 can begin interacting with a base station to perform one or more wireless communication operations, such as facilitating a phone call, transmitting and/or receiving data (e.g., messaging, video, audio, etc.), among other operations. In such cases, other components of the vehicle computing system 550 can be used to output data received by the communications system 558. For example, the infotainment system 554 (described below) can display video received by the communications system 558 on one or more displays and/or can output audio received by the communications system 558 using one or more speakers.

A modem is a device that modulates one or more carrier wave signals to encode digital information for transmission, and demodulates signals to decode the transmitted information. The modem 564 (and/or one or more other modems of the communications system 558) can be used for communication of data for the OEM SIM 560 and/or the user SIM 562. In some examples, the modem 564 can include a 4G (or LTE) modem and another modem (not shown) of the communications system 558 can include a 5G (or NR) modem. In some examples, the communications system 558 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 564 (and/or one or more other modems of the communications system 558) can be used for performing V2X communications (e.g., with other vehicles for V2V communications, with other devices for D2D communications, with infrastructure systems for V2I communications, with pedestrian UEs for V2P communications, etc.). In some examples, the communications system 558 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 558 can be or can include a telematics control unit (TCU). In some implementations, the TCU can include a network access device (NAD) (also referred to in some cases as a network control unit or NCU). The NAD can include the modem 564, any other modem not shown in FIG. 5, the OEM SIM 560, the user SIM 562, and/or other components used for wireless communications. In some examples, the communications system 558 can include a Global Navigation Satellite System (GNSS). In some cases, the GNSS can be part of the one or more sensor systems 556, as described below. The GNSS can provide the ability for the vehicle computing system 550 to perform one or more location services, navigation services, and/or other services that can utilize GNSS functionality.

In some cases, the communications system 558 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 504 to communicate with a network and/or other UEs.

The vehicle computing system 550 can also include an infotainment system 554 that can control content and one or more output devices of the vehicle 504 that can be used to output the content. The infotainment system 554 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 504), and/or other output device.

In some examples, the computing system 550 can include the intelligent transport system (ITS) 555. In some examples, the ITS 555 can be used for implementing V2X communications. For example, an ITS stack of the ITS 555 can generate V2X messages based on information from an application layer of the ITS. In some cases, the application layer can determine whether certain conditions have been met for generating messages for use by the ITS 555 and/or for generating messages that are to be sent to other vehicles (for V2V communications), to pedestrian UEs (for V2P communications), and/or to infrastructure systems (for V2I communications). In some cases, the communications system 558 and/or the ITS 555 can obtain car access network (CAN) information (e.g., from other components of the vehicle via a CAN bus). In some examples, the communications system 558 (e.g., a TCU NAD) can obtain the CAN information via the CAN bus and can send the CAN information to a PHY/MAC layer of the ITS 555. The ITS 555 can provide the CAN information to the ITS stack of the ITS 555. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 555.

The conditions used to determine whether to generate messages can be determined using the CAN information based on safety-related applications and/or other applications, including applications related to road safety, traffic efficiency, infotainment, business, and/or other applications. In one illustrative example, the ITS 555 can perform lane change assistance or negotiation. For instance, using the CAN information, the ITS 555 can determine that a driver of the vehicle 504 is attempting to change lanes from a current lane to an adjacent lane (e.g., based on a blinker being activated, based on the user veering or steering into an adjacent lane, etc.). Based on determining the vehicle 504 is attempting to change lanes, the ITS 555 can determine a lane-change condition has been met that is associated with a message to be sent to other vehicles that are nearby the vehicle in the adjacent lane. The ITS 555 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 504, such as based on V2P communications with a UE of the user), traffic sign recognition, among others.

The ITS 555 can use any suitable protocol to generate messages (e.g., V2X messages). Examples of protocols that can be used by the ITS 555 include one or more Society of Automotive Engineering (SAE) standards, such as SAE J2735, SAE J2945, SAE J3161, and/or other standards, which are hereby incorporated by reference in their entirety and for all purposes.

A security layer of the ITS 555 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 555 can be signed by the security layer of the ITS 555. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 555 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 552) to perform automatic functions, such as automatic breaking, automatic steering (e.g., to maintain a heading in a particular lane), automatic lane change negotiation with other vehicles, among other automatic functions. In one illustrative example, a message can be received by the communications system 558 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 552, which can cause the control system 552 to automatically break the vehicle 504 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 555 can receive a large number of messages from the other UEs (e.g., vehicles, RSUs, etc.), in which case the ITS 555 will authenticate (e.g., decode and decrypt) each of the messages and/or determine which operations to perform. Such a large number of messages can lead to a large computational load for the vehicle computing system 550. In some cases, the large computational load can cause a temperature of the computing system 550 to increase. Rising temperatures of the components of the computing system 550 can adversely affect the ability of the computing system 550 to process the large number of incoming messages. One or more functionalities can be transitioned from the vehicle 504 to another device (e.g., a user device, a RSU, etc.) based on a temperature of the vehicle computing system 550 (or component thereof) exceeding or approaching one or more thermal levels. Transitioning the one or more functionalities can reduce the computational load on the vehicle 504, helping to reduce the temperature of the components. A thermal load balancer can be provided that enable the vehicle computing system 550 to perform thermal based load balancing to control a processing load depending on the temperature of the computing system 550 and processing capacity of the vehicle computing system 550.

The computing system 550 further includes one or more sensor systems 556 (e.g., a first sensor system through an Nth sensor system, where N is a value equal to or greater than ( ). When including multiple sensor systems, the sensor system(s) 556 can include different types of sensor systems that can be arranged on or in different parts the vehicle 504. The sensor system(s) 556 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 550 of the vehicle 504.

While the vehicle computing system 550 is shown to include certain components and/or systems, one of ordinary skill will appreciate that the vehicle computing system 550 can include more or fewer components than those shown in FIG. 5. For example, the vehicle computing system 550 can also include one or more input devices and one or more output devices (not shown). In some implementations, the vehicle computing system 550 can also include (e.g., as part of or separate from the control system 552, the infotainment system 554, the communications system 558, and/or the sensor system(s) 556) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 6:
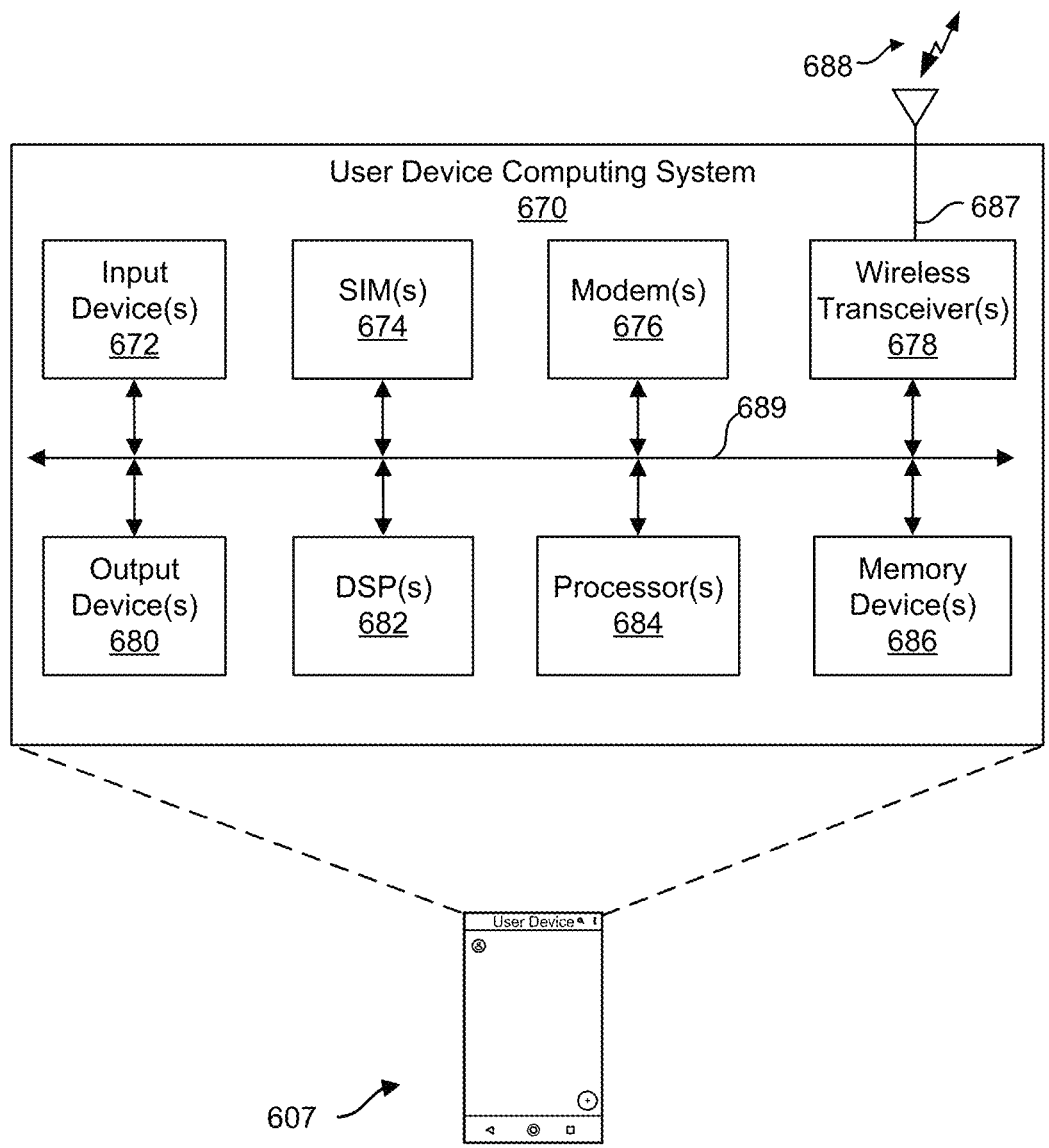
FIG. 6 is a block diagram illustrating an example of a computing system of a user device, in accordance with some aspects of the present disclosure.

FIG. 6 illustrates an example of a computing system 670 of a user device 607. The user device 607 is an example of a UE that can be used by an end-user. For example, the user device 607 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 670 includes software and hardware components that can be electrically or communicatively coupled via a bus 689 (or may otherwise be in communication, as appropriate). For example, the computing system 670 includes one or more processors 684. The one or more processors 684 can include one or more CPUs, ASICs, FPGAS, APs, GPUs, VPUs, NSPs, microcontrollers, dedicated hardware, any combination thereof, and/or other processing device or system. The bus 689 can be used by the one or more processors 684 to communicate between cores and/or with the one or more memory devices 686.

The computing system 670 may also include one or more memory devices 686, one or more digital signal processors (DSPs) 682, one or more SIMs 674, one or more modems 676, one or more wireless transceivers 678, an antenna 687, one or more input devices 672 (e.g., a camera, a mouse, a keyboard, a touch sensitive screen, a touch pad, a keypad, a microphone, and/or the like), and one or more output devices 680 (e.g., a display, a speaker, a printer, and/or the like).

The one or more wireless transceivers 678 can receive wireless signals (e.g., signal 688) via antenna 687 from one or more other devices, such as other user devices, vehicles (e.g., vehicle 504 of FIG. 5 described above), network devices (e.g., base stations such as eNBs and/or gNBs, WiFI routers, etc.), cloud networks, and/or the like. In some examples, the computing system 670 can include multiple antennae. The wireless signal 688 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 678 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 688 into a baseband or intermediate frequency and can convert the RF signals to the digital domain.

In some cases, the computing system 670 can include a coding-decoding device (or CODEC) configured to encode and/or decode data transmitted and/or received using the one or more wireless transceivers 678. In some cases, the computing system 670 can include an encryption-decryption device or component configured to encrypt and/or decrypt data (e.g., according to the AES and/or DES standard) transmitted and/or received by the one or more wireless transceivers 678.

The one or more SIMs 674 can each securely store an IMSI number and related key assigned to the user of the user device 607. As noted above, the IMSI and key can be used to identify and authenticate the subscriber when accessing a network provided by a network service provider or operator associated with the one or more SIMs 674. The one or more modems 676 can modulate one or more signals to encode information for transmission using the one or more wireless transceivers 678. The one or more modems 676 can also demodulate signals received by the one or more wireless transceivers 678 in order to decode the transmitted information. In some examples, the one or more modems 676 can include a 4G (or LTE) modem, a 5G (or NR) modem, a modem configured for V2X communications, and/or other types of modems. The one or more modems 676 and the one or more wireless transceivers 678 can be used for communicating data for the one or more SIMs 674.

The computing system 670 can also include (and/or be in communication with) one or more non-transitory machine-readable storage media or storage devices (e.g., one or more memory devices 686), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 686 and executed by the one or more processor(s) 684 and/or the one or more DSPs 682. The computing system 670 can also include software elements (e.g., located within the one or more memory devices 686), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 7:
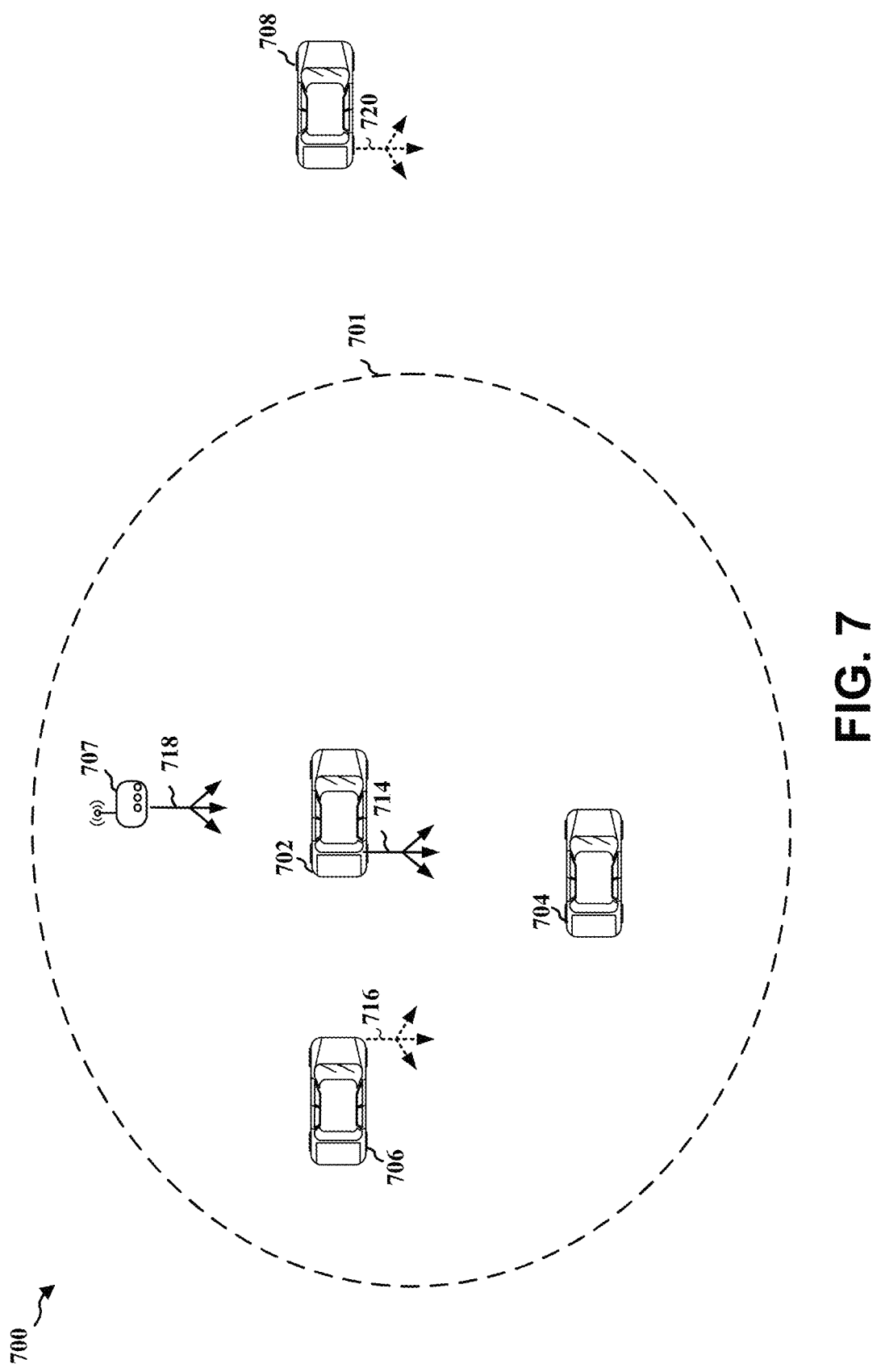
FIG. 7 is a diagram illustrating an example of devices involved in wireless communications (e.g., sidelink communications), in accordance with some aspects of the present disclosure.

FIG. 7 illustrates an example 700 of wireless communication between devices based on sidelink communication, such as V2X or other D2D communication. The communication may be based on a slot structure comprising aspects described in connection with FIG. 2. For example, transmitting UE 702 may transmit a transmission 714, e.g., comprising a control channel and/or a corresponding data channel, that may be received by receiving UEs 704, 706, 708. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 702, 704, 706, 708 may each be capable of operating as a transmitting device in addition to operating as a receiving device. Thus, UEs 706, 708 are illustrated as transmitting transmissions 716, 720. The transmissions 714, 716, 720 (and 718 by RSU 707) may be broadcast or multicast to nearby devices. For example, UE 714 may transmit communication intended for receipt by other UEs within a range 701 of UE 714. Additionally/alternatively, RSU 707 may receive communication from and/or transmit communication 718 to UEs 702, 704, 706, 708.

Figure 8A:
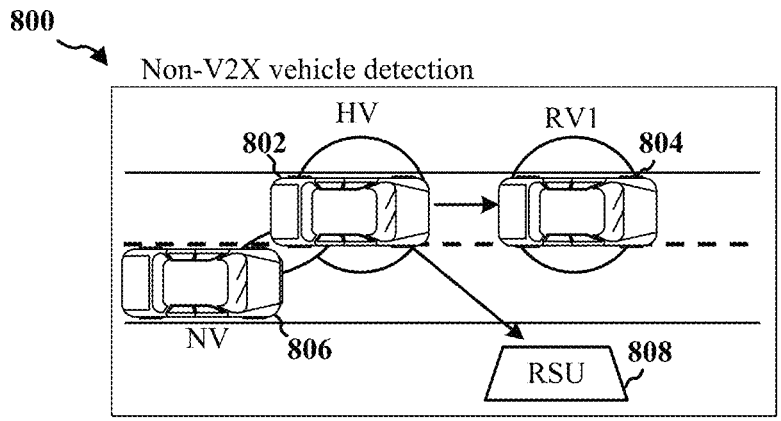
FIGS. 8A-8D are diagrams illustrating examples of sensor-sharing for cooperative and automated driving systems, in accordance with some aspects of the present disclosure.
Figure 8B:
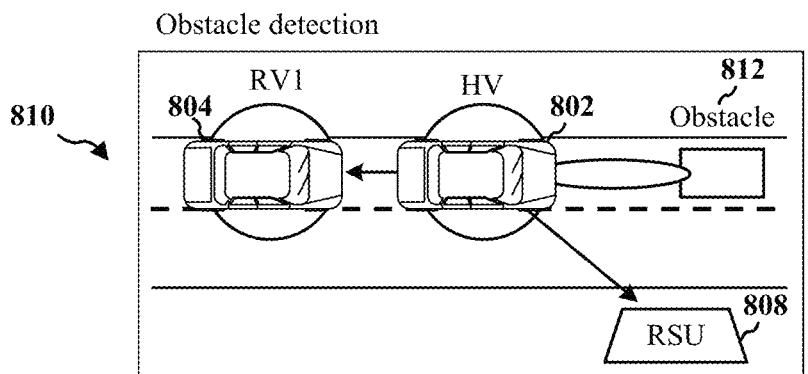
Figure 8C:
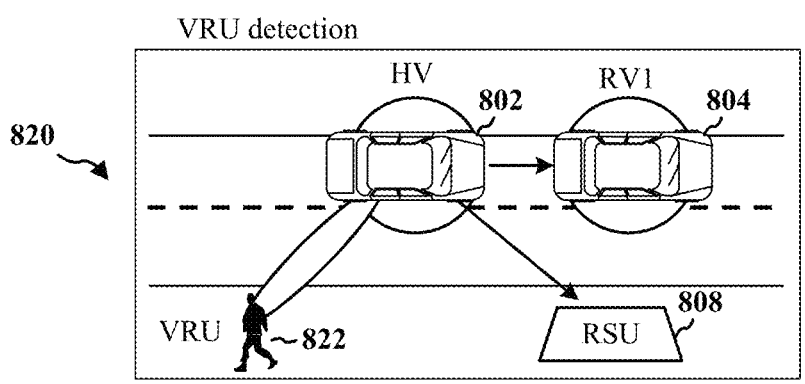
Figure 8D:
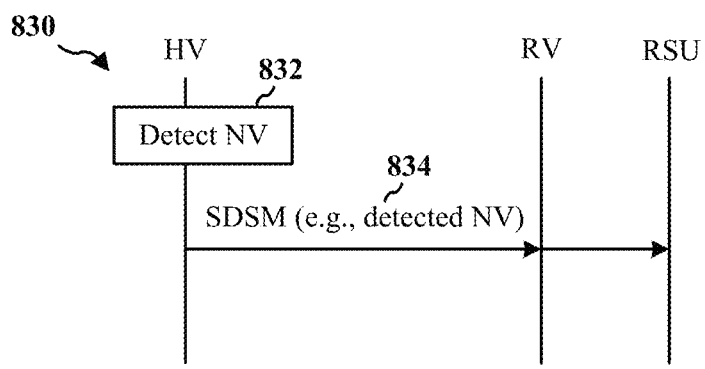
Figure 9:
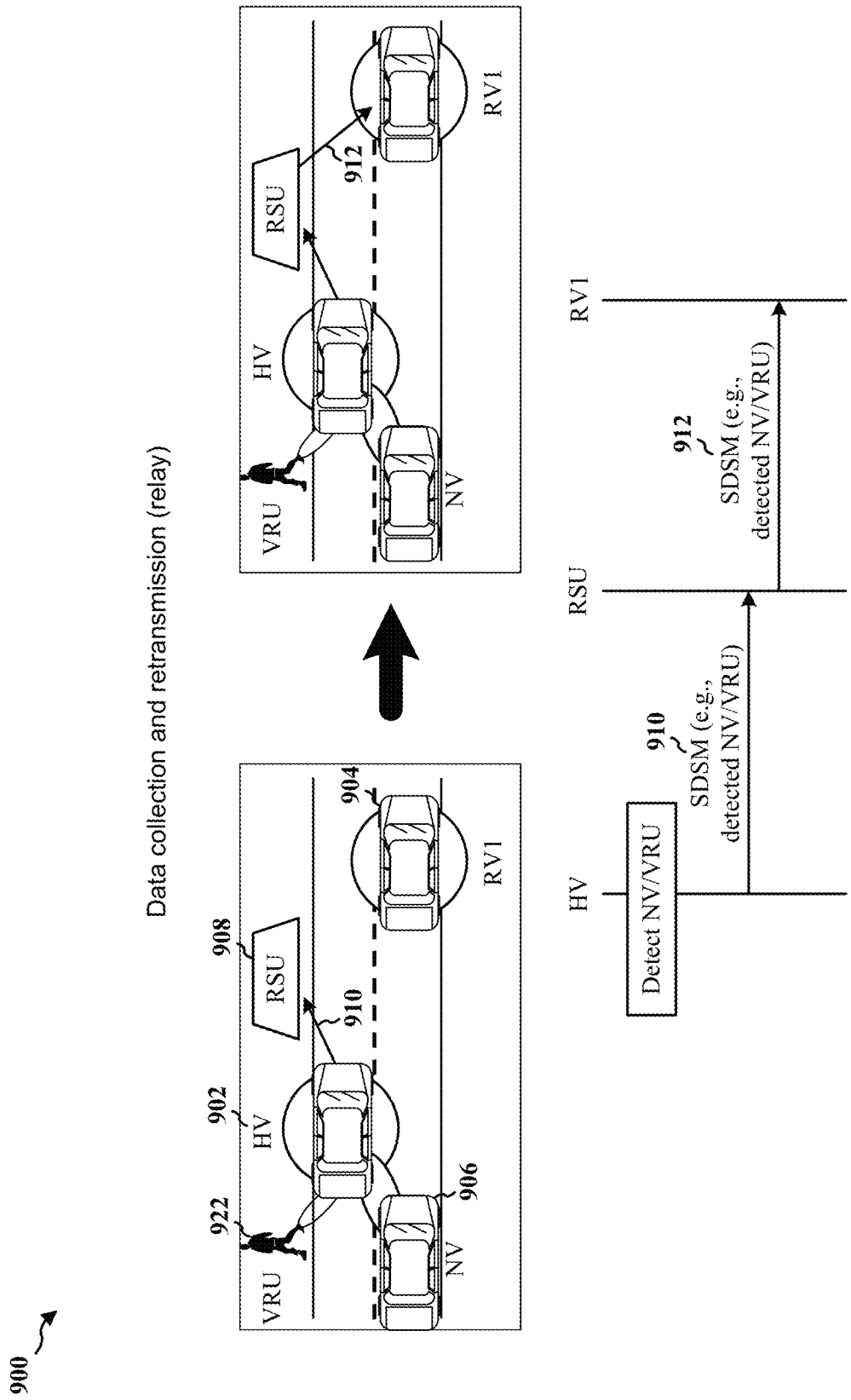
FIG. 9 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 800 of FIG. 8A, the host vehicle (HV) 802 may detect a number of items within its environment. For example, the HV 802 may detect the presence of the non-V2X entity (NV) 806 at block 832. The HV 802 may inform other entities, such as a first remote vehicle (RV1) 804 or a road side unit (RSU) 808, about the presence of the NV 806, if the RV1 804 and/or the RSU 808, by themselves, are unable to detect the NV 806. The HV 802 informing the RV1 804 and/or the RSU 808 about the NV 806 is a sharing of sensor information. With reference to diagram 810 of FIG. 8B, the HV 802 may detect a physical obstacle 812, such as a pothole, debris, or an object that may be an obstruction in the path of the HV 802 and/or RV1 804 that has not yet been detected by RV1 804 and/or RSU 808. The HV 802 may inform the RV1 and/or the RSU 808 of the obstacle 812, such that the obstacle 812 may be avoided. With reference to diagram 820 of FIG. 8C, the HV 802 may detect the presence of a vulnerable road user (VRU) 822 and may share the detection of the VRU 822 with the RV1 804 and the RSU 808, in instances where the RSU 808 and/or RV1 804 may not be able to detect the VRU 822. With reference to diagram 830 of FIG. 8D, the HV, upon detection of a nearby entity (e.g., NV, VRU, obstacle) may transmit a sensor data sharing message (SDSM) 834 to the RV and/or the RSU to share the detection of the entity. The SDSM 834 may be a broadcast message such that any receiving device within the vicinity of the HV may receive the message. In some instances, the shared information may be relayed to other entities, such as RVs. For example, with reference to diagram 900 of FIG. 9, the HV 902 may detect the presence of the NV 906 and/or the VRU 922. The HV 902 may broadcast the SDSM 910 to the RSU 908 to report the detection of NV 906 and/or VRU 922. The RSU 908 may relay the SDSM 910 received from the HV 902 to remote vehicles such that the remote vehicles are aware of the presence of the NV 906 and/or VRU 922. For example, the RSU 908 may transmit an SDSM 912 to the RV1 904, where the SDSM 912 includes information related to the detection of NV 906 and/or VRU 922.

Figure 10:
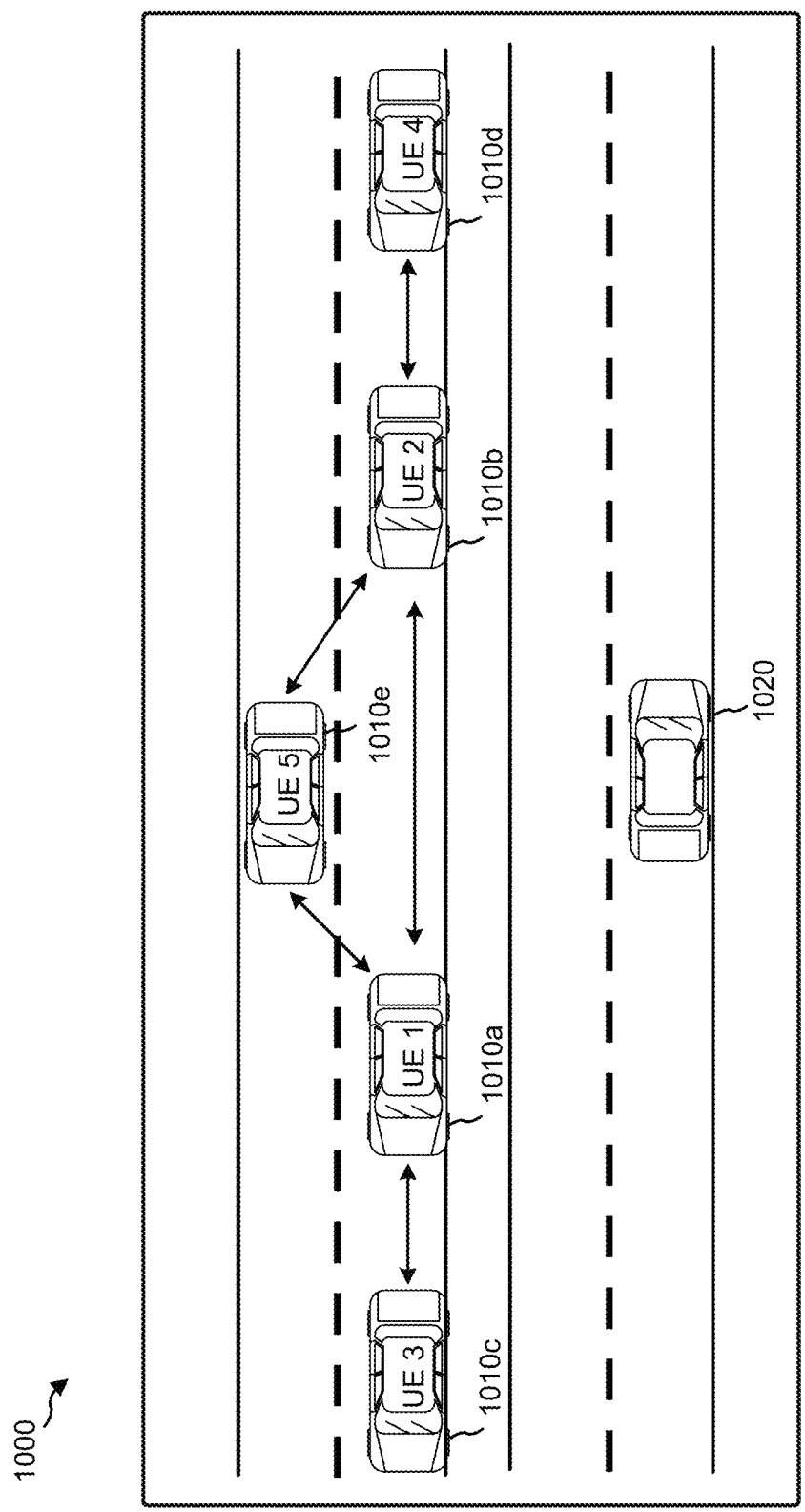
FIG. 10 is a diagram illustrating an example of a system for sidelink synchronization source selection for vehicle-based communications (e.g., C-V2X communications), in accordance with some aspects of the present disclosure.

FIG. 10 is a diagram illustrating an example of a system 1000 for sidelink synchronization source selection (e.g., PRS-driven synchronization source-driven) for vehicle-based communications (e.g., C-V2X communications), in accordance with some aspects of the present disclosure. In FIG. 10, the system 1000 is shown to include a plurality of equipped (e.g., V2X capable) network devices. The plurality of equipped network devices includes vehicles (e.g., automobiles) 1010*a* (UE 1), 1010*b* (UE 2), 1010*c* (UE 3), 1010*d* (UE 4), 1010*e* (UE 5), 1020. In FIG. 10, the vehicles (e.g., automobiles) 1010*a* (UE 1), 1010*b* (UE 2), 1010*c* (UE 3), 1010*d* (UE 4), and 1010*e* (UE 5) are all shown to be driving on one side of the highway in the same direction. In FIG. 10, the vehicle 1020 is shown to be driving on the opposite side of the highway and in the opposite direction of the vehicles (e.g., automobiles) 1010*a* (UE 1), 1010*b* (UE 2), 1010*c* (UE 3), 1010*d* (UE 4), and 1010*e* (UE 5).

The system 1000 may comprise more or less equipped network devices, than as shown in FIG. 10. In addition, the system 1000 may comprise non-equipped network devices (not shown in FIG. 10), such as non-equipped vehicles, vulnerable road users (VRUs), such as cyclists, and pedestrians. In addition, the system 1000 may comprise more or less different types of equipped network devices (e.g., which may include equipped UEs), than as shown in FIG. 10. In addition, in one or more examples, the equipped network devices may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices may be capable of performing V2X communications. In addition, at least some of the equipped network devices are capable of transmitting and receiving sensing signals for radar (e.g., RF sensing signals) and/or LIDAR (e.g., optical sensing signals) to detect nearby vehicles and/or objects. In some cases, the equipped network devices can detect nearby vehicles and/or objects using one or more cameras. In one or more examples, vehicles 1010a, 1010b, 1010c, 1010d, 1010e, 1020 may be capable of transmitting and receiving sensing signals of some kind (e.g., camera, radar, and/or LIDAR sensing signals).

In some examples, some of the equipped network devices 1010a, 1010b, 1010c, 1010d, 1010e, 1020 may have higher capability sensors (e.g., GPS receivers, cameras, RF antennas, and/or optical lasers and/or optical sensors) than other equipped network devices of the system 1000. For example, vehicle (e.g., automobile) 1010a may have more expensive, higher capability sensors than the other vehicles (e.g., automobiles) 1010b, 1010c, 1010d, 1010e, 1020. In one illustrative example, vehicle 1010a may have one or more higher capability LIDAR sensors (e.g., high capability optical lasers and optical sensors) than the other equipped network devices in the system 1000. For instance, the LIDAR of vehicle 1010a may be able to detect a VRU (e.g., cyclist) and/or a pedestrian with a large degree of confidence (e.g., a seventy percent degree of confidence). In another example, vehicle 1010a may have higher capability radar (e.g., high capability RF antennas) than the other equipped network devices in the system 1000. For instance, the radar of vehicle 1010a may be able to detect a VRU and/or pedestrian with a degree of confidence (e.g., an eight-five percent degree of confidence).

During operation, the equipped network devices (e.g., vehicles 1010a, 1010b, 1010c, 1010d, 1010e, 1020) may transmit and/or receive sensing signals (e.g., RF and/or optical signals) to sense and detect vehicles (e.g., vehicles 1010a, 1010b, 1010c, 1010d, 1010e, 1020) and/or objects (not shown) located within and surrounding the road. The equipped network devices (e.g., vehicles 1010a, 1010b, 1010c, 1010d, 1010e, 1020) may then use the sensing signals to determine characteristics (e.g., motion, dimensions, type, heading, and speed) of the detected vehicles and/or objects.

As previously mentioned, for positioning accuracy of vehicles, C-V2X (e.g., the C-V2X access layer) requires stringent (tight) time and frequency synchronization to provide for lane level and sub-lane level accurate positioning for many C-V2X applications. Whenever GNSS coverage is available, C-V2X utilizes GNSS for both time synchronization and positioning. GNSS uses satellites to extract real-time, exact, fast, and continuous three-dimensional position location, velocity information, and/or timing information. However, in GNSS-challenged environments (such as in tunnels, canyons, dense urban areas, or underground parking garages), C-V2X relies on other synchronization sources, such as SLSS, and relies on other positioning techniques, such as sidelink positioning.

Sidelink positioning utilizes a RTT measurement of a wideband signal (e.g. a positioning reference signal). For example, when two vehicles (e.g., two UEs) desire to position themselves with respect to one another, the vehicles each transmit a wideband signal (e.g., a wideband signal, such as 100 Megahertz in width, within an unlicensed frequency spectrum) and each measure the RTT of their respective transmitted signal. From the measured RTT, each of the vehicles can determine their distance from one another and position themselves accordingly. However, since the signal utilized for the RTT measurement is a wideband signal, a stringent (tight) synchronization is required between the two vehicles to achieve an accurate positioning.

In one or more examples, during operation, for example during a phase in which reference signals (e.g., positioning reference signals (PRS), sounding reference signals (SRSs), etc.) are transmitted, the equipped network devices (e.g., vehicles 1010a, 1010b, 1010c, 1010d, 1010e, 1020) may transmit and/or receive signals (e.g., PRSs) that can be used for determining the position(s) of one or more vehicles (e.g., vehicles 1010a, 1010b, 1010c, 1010d, 1010e, 1020) based on sidelink positioning. For sidelink positioning, when two vehicles (e.g., vehicles 1010a and 1010b) desire to position themselves with respect to one another, the vehicles (e.g., vehicles 1010a and 1010b) may each transmit a wideband signal and each measure the RTT of their respective transmitted signal. For example, vehicle 1010a (UE 1) may transmit a signal to vehicle 1010b (UE 2) and receive a corresponding signal from vehicle 1010b. Similarly, for example, vehicle 1010b (UE 2) may transmit a signal to vehicle 1010a (UE 1) and receive a corresponding signal from vehicle 1010a.

Then, during a post positioning reference signal (post-PRS) phase, the vehicles 1010a, 1010b can calculate the round-trip-times (RTTs) of the signals. For example, vehicle 1010a can calculate the RTT from the time the signal was transmitted by the vehicle 1010a to the vehicle 1010b to the time the corresponding signal was received by the vehicle 1010a from the vehicle 1010b. Vehicle 1010b can calculate the RTT from the time the signal was transmitted by the vehicle 1010b to the vehicle 1010a to the time the corresponding signal was received by the vehicle 1010b from the vehicle 1010a. The vehicles 1010a, 1010b may then each report (transmit) their calculated RTT to the other vehicle 1010a, 1010b. From the measured RTTs, each of the vehicles 1010a, 1010b can determine their distance from one another and position themselves accordingly. For example, from the calculated RTTs, vehicle 1010a can estimate the distance to vehicle 1010b and position itself with respect to vehicle 1010b. From the calculated RTTs, vehicle 1010b can estimate the distance to vehicle 1010a and position itself with respect to vehicle 1010a. It should be noted that since the signal utilized for each of the RTT measurements is a wideband signal, a stringent (tight) synchronization is required between the two vehicles (e.g., vehicles 1010a, 1010b) to achieve an accurate positioning of the vehicles (e.g., vehicles 1010a, 1010b).

Prior to sending the positioning reference signals for sidelink positioning, for example during a pre-positioning reference signal (prePRS) phase, the two vehicles (e.g., vehicles 1010a, 1010b) may each determine their synchronization reference source (referred to herein as a Sync Ref), which is a source for source and may include a UE (e.g., a vehicle, an RSU, network-connected infrastructure such as a stoplight, etc.). When a vehicle (e.g., vehicles 1010a, 1010b) chooses a UE as their Sync Ref UE, the vehicle (e.g., vehicles 1010a, 1010b) can be synchronized to the Sync Ref UE by extracting the direct frame number, subframe number, and slot boundary from the Sync Ref UE. It should be noted that according to current 3GPP standards, there are priorities established for the choosing of a Sync Ref. FIG. 13 shows a table 1300 containing priorities for choosing a Sync Ref, and is described in detail below.

In addition, for a vehicle (e.g., vehicles 1010a, 1010b) to choose a UE (e.g., a vehicle) as their Sync Ref UE, the vehicle (e.g., vehicles 1010a, 1010b) should be able to detect (e.g., be located within range of) the chosen UE. For example, for the system 1000 of FIG. 10, vehicle 1010*a* (UE 1) may choose vehicle 1010*c* (UE 3) to be its Sync Ref because vehicle 1010*c* (UE 3) is located within communication range of vehicle 1010*a* (UE 1). For instance, the communication range can be a range for which the vehicle 1010*a* can communicate with the Sync Ref using C-V2X, DSRC, or other sidelink communication protocol. In another example, vehicle 1010*b* (UE 2) may choose vehicle 1010*d* (UE 4) to be its Sync Ref UE because vehicle 1010*d* (UE 4) is located within range of vehicle 1010*b* (UE 2). However, it should be noted that, in this example, since the vehicles (e.g., vehicles 1010*a*, 1010*b*) each chose a different UE (e.g., vehicles 1010*c*, 1010*d*) as their Sync Ref UE (e.g., vehicle 1010*a* chose vehicle 1010*c* as its Sync Ref UE, and vehicle 1010*b* chose vehicle 1010*d* as its Sync Ref UE), the vehicles (e.g., vehicles 1010*a*, 1010*b*) do not have a common Sync Ref UE. In such cases, there may be some drift in synchronization between the two vehicles (e.g., vehicles 1010*a*, 1010*b*), such as due to propagation delays. This drift in synchronization between the two vehicles (e.g., vehicles 1010*a*, 1010*b*) will lead to inaccuracies in their positioning.

The disclosed systems and techniques provide a solution for selecting an optimum Sync Ref (e.g., a Sync Ref UE) for the vehicles (e.g., vehicles 1010*a*, 1010*b*) to provide for improved synchronization between the vehicles for positioning purposes and in some cases for communications purposes. In one or more examples, during the prePRS phase, the vehicles (e.g., vehicles 1010*a*, 1010*b*) may negotiate amongst themselves to use a different Sync Ref UE than as outlined by the established priorities for choosing a Sync Ref (e.g., table 1300 in FIG. 13), to provide for better synchronization between the vehicles (e.g., vehicles 1010*a*, 1010*b*).

For example, during the prePRS phase, the vehicles (e.g., 1010*a*, 1010*b*) may negotiate using, if possible, the same UE (e.g., vehicle 1010*e*) as their Sync Ref UE. For example, both vehicle 1010*a* (UE 1) and vehicle 1010*b* (UE 2) may decide to choose vehicle 1010*e* (UE 5) to be their Sync Ref UE because vehicle 1010*e* (UE 5) is located within range of both vehicle 1010*a* (UE 1) and vehicle 1010*b*. When vehicle 1010*a* (UE 1) and vehicle 1010*b* (UE 2) choose the same Sync Ref UE (e.g., vehicle 1010*e*), the vehicles 1010*a*, 1010*b* then have a common synchronization source, which will prevent any possible drift in their synchronization with each other.

It should be noted that, in one or more examples, during the prePRS phase, a vehicle (e.g., vehicle 1010*a*) may choose to use the same UE (e.g., vehicle 1010*e*) as its Sync Ref UE for both communications and positioning purposes. In other examples, during the prePRS phase, a vehicle (e.g., vehicle 1010*a*) may choose to use one UE (e.g., vehicle 1010*c*) as its Sync Ref UE for communications purposes, and use another UE (e.g., vehicle 1010*e*) as its Sync Ref UE for positioning purposes.

Figure 11:
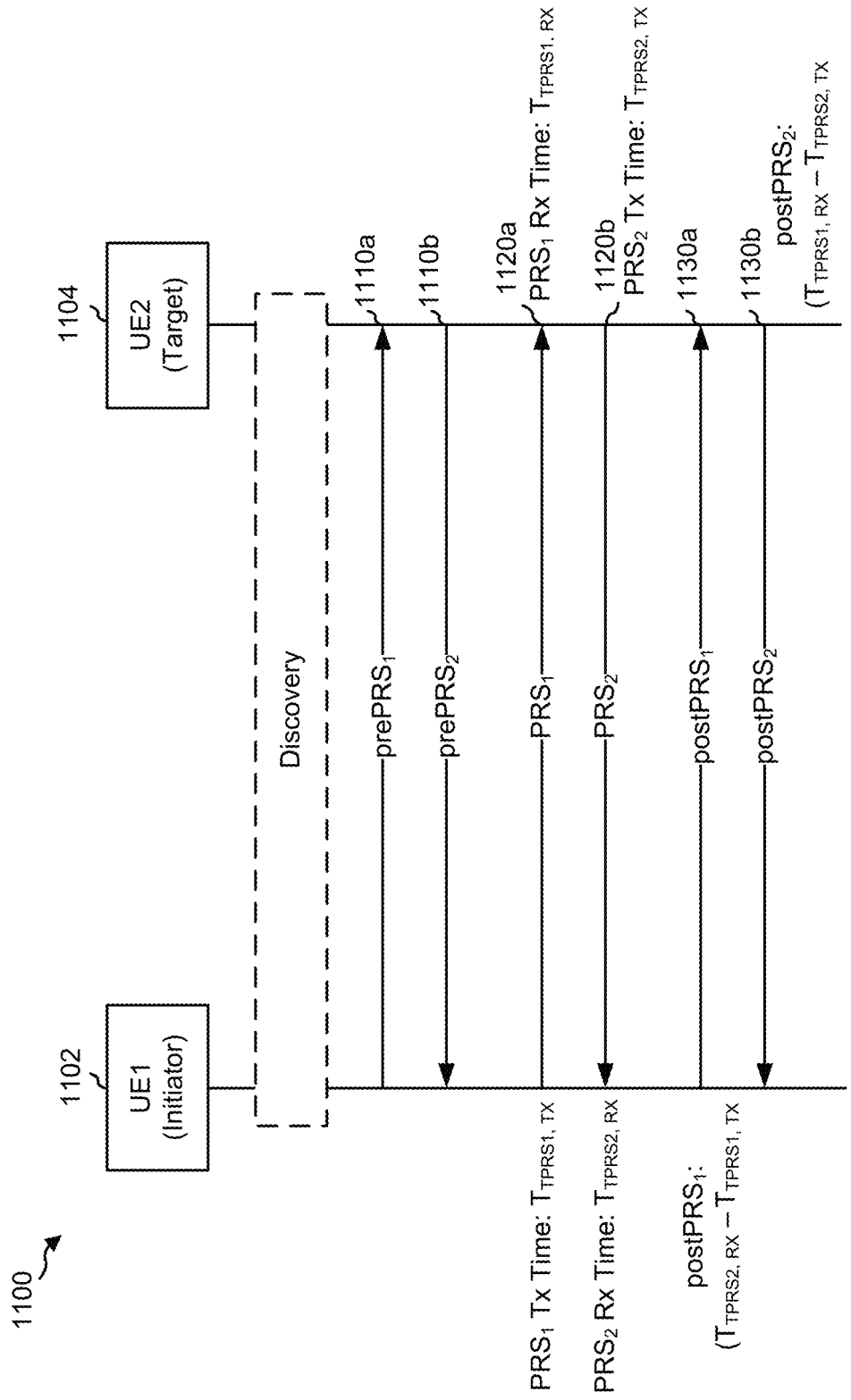
FIG. 11 is a diagram of an example of a communication (e.g., a C-V2X communications) exchange for the system for sidelink synchronization source selection, in accordance with some aspects of the present disclosure.

FIG. 11 is a diagram of an example of a communication (e.g., a C-V2X communications) exchange 1100 for the system for sidelink PRS-driven synchronization source selection, in accordance with some aspects of the present disclosure. In FIG. 11, two UEs (e.g., UE 1 1102 and UE 2 1104) desire to position themselves with respect to one another. During the communication exchange 1100, after an optional discovery period to discover participating UEs (e.g., UE 1 1102 and UE 2 1104) and during a prePRS phase, UE 1 1102 (which may be referred to as an "initiator") may send (transmit) a prePRS signal (e.g., a Sync Ref negotiation signal) 1110*a* to UE 2 1104 (which may be referred to as a "target") regarding the selection of a Sync Ref by UE 1 1102. The prePRS signal 1110*a* may include a priority of the Sync Ref UE initially chosen by UE 1 1102, an in coverage (INC) indicator, and an identification (e.g., a Layer 2 address) of the Sync Ref UE initially chosen by UE 1 1102. Then, UE 2 1104 may send (transmit) a prePRS signal (e.g., a Sync Ref negotiation signal) 1110*b* to UE 1 1102 regarding the selection of a Sync Ref UE by UE 2 1104. The prePRS signal 1110*b* may include a priority of the Sync Ref UE initially chosen by UE 2 1104, an INC indicator, and an identification (e.g., a Layer 2 address) of the Sync Ref UE initially chosen by UE 2 1104. It should be noted that the prePRS signals 1110*a*, 1110*b* may be sent (transmitted) within a licensed C-V2X frequency band.

In some aspects, synchronization signals are transmitted by synchronization sources for other devices (e.g., vehicles or other UEs, RSUs, base stations or portions thereof, etc.) to choose the synchronization sources as synchronization reference sources, such as based on the priorities shown in FIG. 13. According to the current 3GPP standards, synchronization signals are transmitted via a sidelink-synchronizing signal block (S-SSB), which provides for the transport of only the priority of the initially chosen Sync Ref UE and the INC indicator, but not the identification (e.g., a Layer 2 address) of the initially chosen Sync Ref UE. The S-SSB format does not allow for the transport of an identification (e.g., a Layer 2 address) of the initially chosen Sync Ref UE.

As such, according to one or more aspects of the systems and techniques described herein, the synchronization signals may be transported via a medium access control-control element (MAC-CE), which provides for the transport of the priority of the initially chosen Sync Ref UE and the INC indicator as well as the identification (e.g., a Layer 2 address) of the initially chosen Sync Ref UE. The initiator and/or the one or more targets may thus be aware of each other as synchronization sources and also may have access to the identification of each other for performing the techniques described herein. In one or more examples, the information related to the initially chosen Sync Ref UEs may be sent via a MAC-CE, a V2X layer message, and/or an application layer message. Various aspects of the systems and techniques described herein will be described below with respect to the processes 1400, 1500 shown in FIGS. 14 and 15. In some aspects, the processes 1400, 1500 described below with respect to FIGS. 14 and 15 may occur during the prePRS phase. These processes 1400, 1500 outline specific disclosed systems and techniques for the negotiation of a Sync Ref for the UEs (e.g., UE 1 1102, UE 2 1104). As such, multiple additional signals (not shown in FIG. 11) will be transmitted back and forth from UE 1 1102 and UE 2 1104 during the prePRS phase, according to the process flow of the processes 1400, 1500 of FIGS. 14 and 15. For example, according to aspects described herein, an initiator UE (e.g., an initiator vehicle, etc.) and one or more target UEs (e.g., a target vehicle, etc.) may exchange messages (e.g., via a MAC-CE, a V2X layer message, and/or an application layer message) regarding their chosen synchronization reference sources to potentially agree on a new synchronization reference source for at least a duration of a positioning session during which the initiator and target(s) are performing sidelink positioning.

Returning to FIG. 11, after the prePRS phase and during the PRS phase, UE 1 1102 may send (transmit) a reference signal (e.g., PRS signal) 1120*a* to UE 2 1104. UE 2 1104 may send (transmit) a reference signal (e.g., PRS signal) 1120*b* to UE 1 1102. It should be noted that reference signals (e.g., PRS signals) 1120*a*, 1120*b* may be sent within an unlicensed C-V2X frequency band, which has a wide frequency bandwidth. Since the reference signals (e.g., PRS signals) 1120a, 1120b may be sent within a wideband signal, a stringent (tight) synchronization is required between the two UEs (e.g., UE 1 1102 and UE 2 1104) to achieve an accurate positioning of the UEs (e.g., UE 1 1102 and UE 2 1104).

After the reference signals (e.g., PRS signals) 1120a, 1120b have been sent, during a postPRS phase, the UE 1 1102 and UE 2 1104 can calculate the RTT of the signals. For example, the UE 1 1102 and UE 2 1104 can calculate the time from when the reference signal (e.g., PRS signal) 1120a was transmitted to the time when the reference signal (e.g., PRS signal) 1120a was received, and calculate the time from when the reference signal (e.g., PRS signal) 1120b was transmitted to the time when the reference signal (e.g., PRS signal) 1120b was received.

The UEs (e.g., UE 1 1102 and UE 2 1104) may then each send (transmit) a postPRS signal 1130a, 1130b containing the calculated RTT of the signals to each other (as well as send to any other participating UEs, such as any additional targets). From the measured RTT of the signals, each of the UEs (e.g., UE 1 1102 and UE 2 1104) can determine their distance (ranging) from one another and position themselves accordingly. For example, from the calculated RTT of the signals, UE 1 1102 can estimate the distance to UE 2 1104 and position itself with respect to UE 2 1104. In some cases, from the calculated RTT of the signals, UE 2 1104 can estimate the distance to UE 1 1102 and position itself with respect to UE 1 1102. It should be noted that the postPRS signals 1130a, 1130b may be sent (transmitted) within a licensed C-V2X frequency band.

Figure 12:
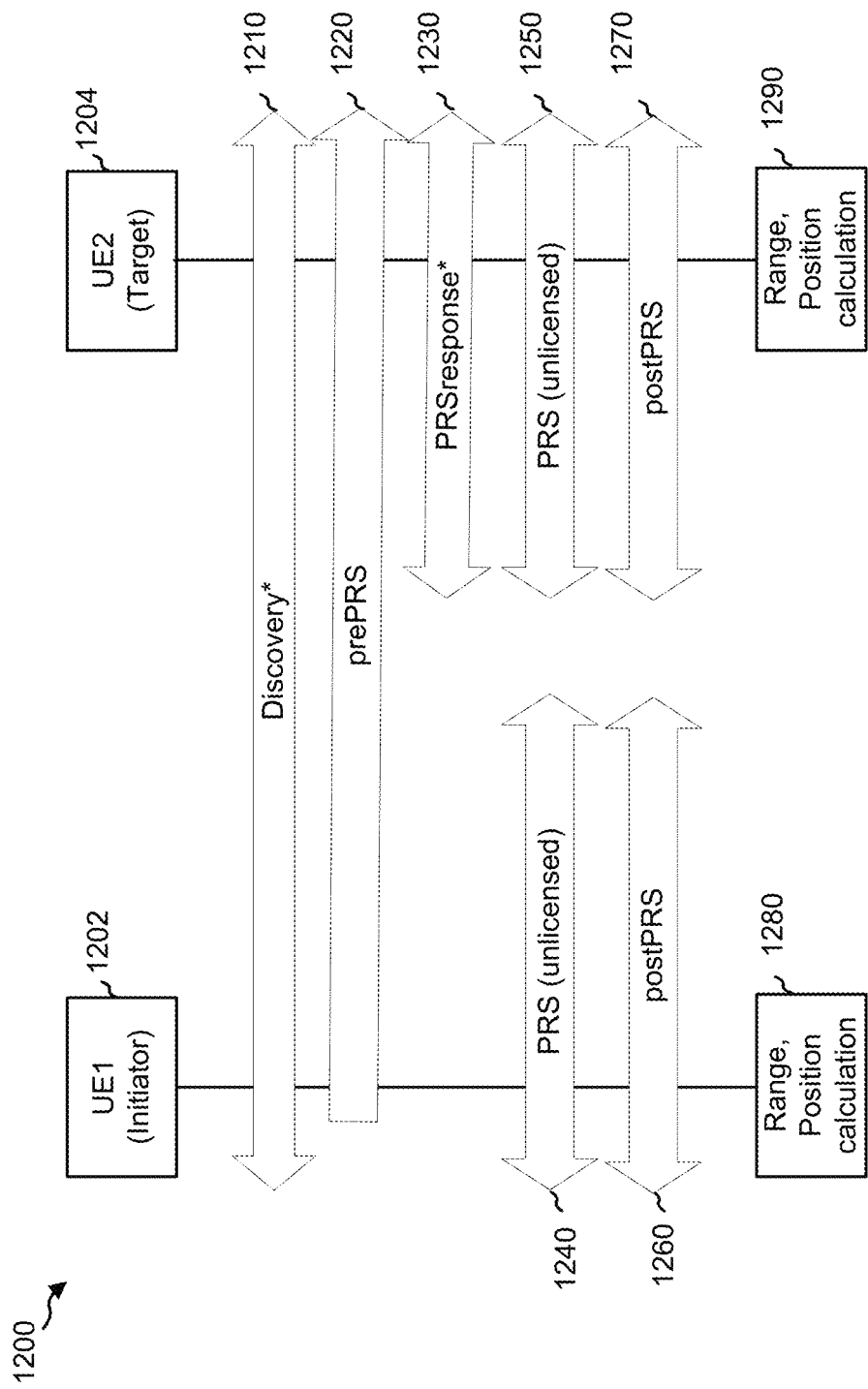
FIG. 12 is a diagram of another example of a communication (e.g., a C-V2X communications) exchange for the system for sidelink synchronization source selection, in accordance with some aspects of the present disclosure.

FIG. 12 is a diagram of another example of a communication (e.g., a C-V2X communications) exchange 1200 for the system for sidelink PRS-driven synchronization source selection, in accordance with some aspects of the present disclosure. It should be noted that FIG. 12 is simply an alternative conceptual illustration of essentially the same communication exchange concept as illustrated in FIG. 11.

In FIG. 12, two UEs (e.g., UE 1 1202 and UE 2 1204) desire to position themselves with respect to one another. During the communication exchange 1200, during an optional (which is denoted in the figure by an asterisk "*") discovery period 1210, the two UEs (e.g., UE 1 1202 and UE 2 1204) send (transmit) signals to discover participating UEs (e.g., UE 1 1202 and UE 2 1204).

After the optional discovery period 1210 and during the prePRS phase, UE 1 1202 (which may be referred to as an "initiator") may send (transmit) a prePRS signal (e.g., a Sync Ref negotiation signal) 1220 to UE 2 1204 (which may be referred to as a "target") regarding the selection of a Sync Ref UE by UE 1 1202. The prePRS signal 1220 may include a priority of the Sync Ref UE initially chosen by UE 1 1202, an INC indicator, and an identification (e.g., a Layer 2 address) of the Sync Ref UE initially chosen by UE 1 1202. UE 2 1204 may then send (transmit) a prePRS signal (e.g., a Sync Ref negotiation signal) 1230 to UE 1 1202 regarding the selection of a Sync Ref UE by UE 2 1204. The prePRS signal 1230 may include a priority of the Sync Ref UE initially chosen by UE 2 1204, an INC indicator, and an identification (e.g., a Layer 2 address) of the Sync Ref UE initially chosen by UE 2 1204. The prePRS signals 1220, 1230 may be sent (transmitted) within a licensed C-V2X frequency band. In some examples, the prePRS signals 1220, 1230 may be transported via a MAC-CE, which provides for the transport of the priority of the initially chosen Sync Ref UE and the INC indicator as well as the identification (e.g., a Layer 2 address) of the initially chosen Sync Ref UE. In one or more examples, the information related to the initially chosen Sync Ref UEs may be sent via a MAC-CE, a V2X layer message, and/or an application layer message.

Figure 14:
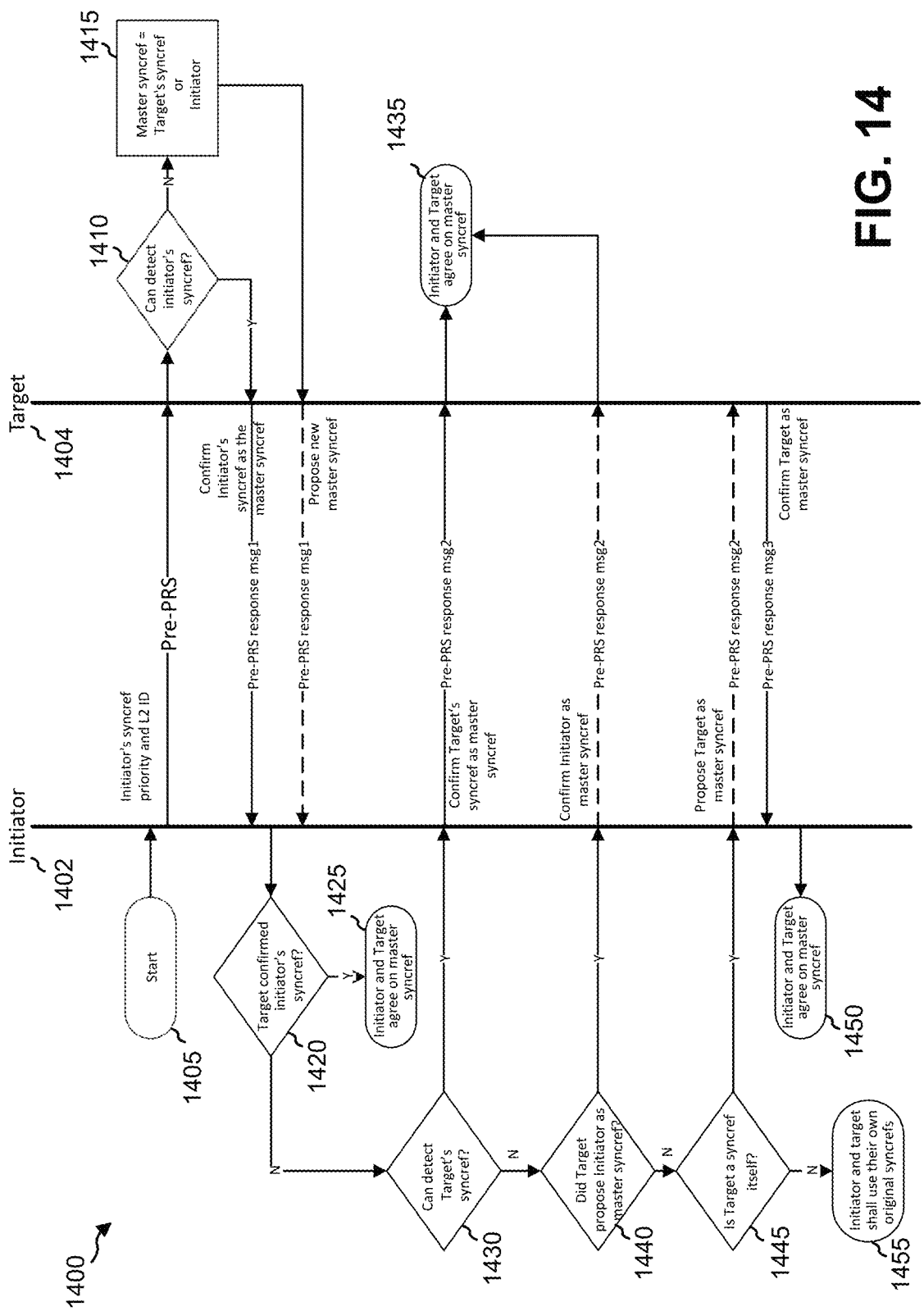
FIG. 14 is a flow diagram illustrating an example of a process for sidelink synchronization source selection for vehicle-based communications (e.g., C-V2X communications), where there is a single initiator and a single target, in accordance with some aspects of the present disclosure.
Figure 15:
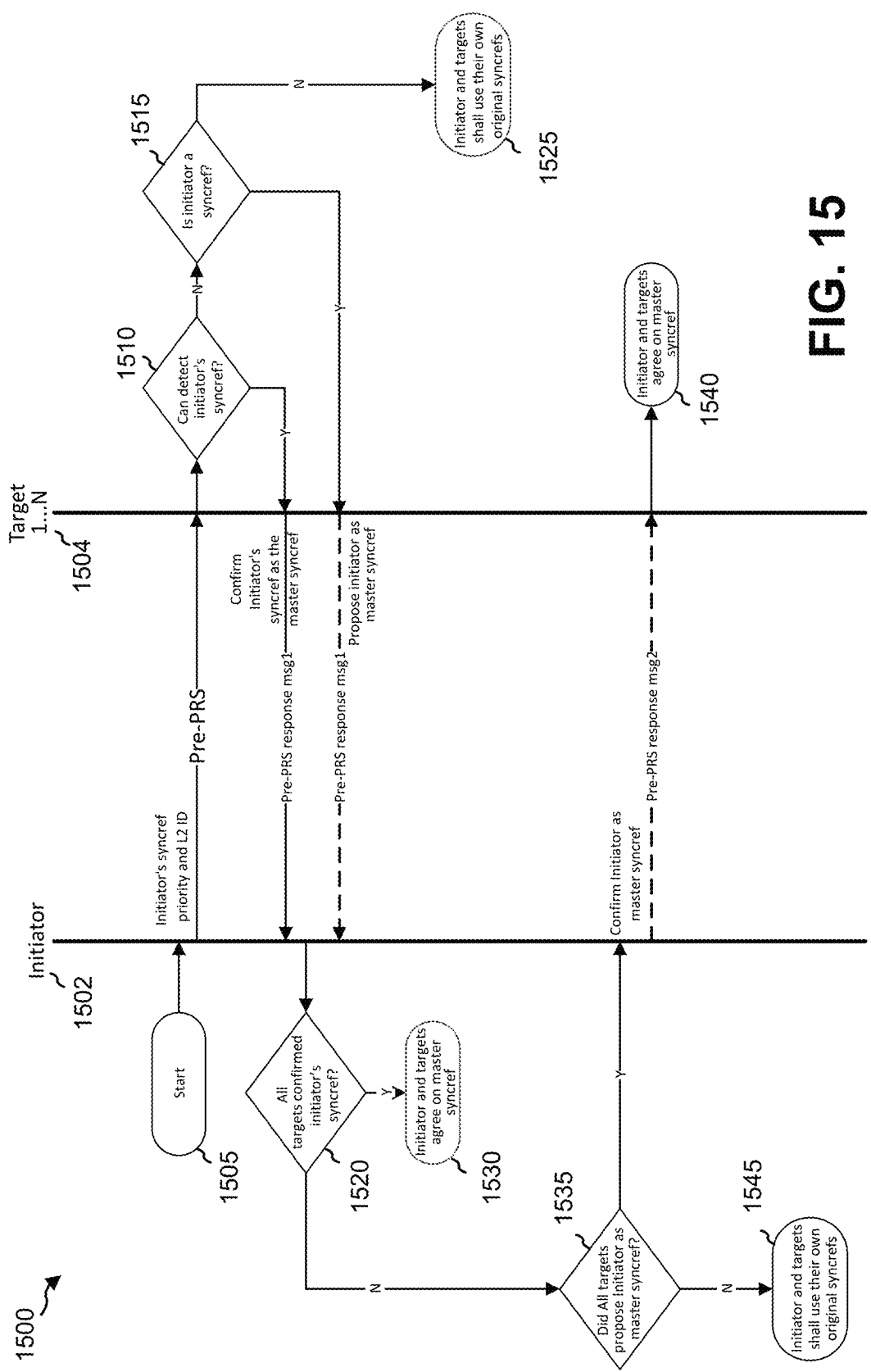
FIG. 15 is a flow diagram illustrating an example of a process for sidelink synchronization source selection for vehicle-based communications (e.g., C-V2X communications), where there is a single initiator and N number of targets, in accordance with some aspects of the present disclosure.

The processes 1400, 1500 of FIGS. 14 and 15 may additionally occur during the prePRS phase of the communication exchange 1200. These processes 1400, 1500 outline specific disclosed methods for the negotiation of an optimum Sync Ref for the UEs (e.g., UE 1 1202, UE 2 1204). Thus, multiple additional signals (not shown in FIG. 12) will be transmitted back and forth from UE 1 1202 and UE 2 1204 during the prePRS phase of the communication exchange 1200, according to the process flow of the processes 1400, 1500 of FIGS. 14 and 15.

After the prePRS phase and during the PRS phase, UE 1 1202 may send (transmit) a reference signal (e.g., PRS signal) 1240 to UE 2 1204. The UE 2 1204 may send (transmit) a reference signal (e.g., PRS signal) 1250 to UE 1 1202. The reference signals (e.g., PRS signals) 1240, 1250 may be sent within an unlicensed C-V2X frequency band, which has a wide frequency bandwidth. Since the reference signals (e.g., PRS signals) 1240, 1250 may be sent within a wideband signal, a stringent (tight) synchronization is required between the two UEs (e.g., UE 1 1202 and UE 2 1204) to achieve an accurate positioning of the UEs (e.g., UE 1 1202 and UE 2 1204).

After the reference signals (e.g., PRS signals) 1240, 1250 have been sent, during a postPRS phase, the UEs (e.g., UE 1 1202 and UE 2 1204) can calculate the RTT of the signals. The UEs (e.g., UE 1 1202 and UE 2 1204) can calculate the time from when the reference signal (e.g., PRS signal) 1240 was transmitted to the time when the reference signal (e.g., PRS signal) 1240 was received, and calculate the time from when the reference signal (e.g., PRS signal) 1250 was transmitted to the time when the reference signal (e.g., PRS signal) 1250 was received.

Then, the UEs (e.g., UE 1 1202 and UE 2 1204) may each send (transmit) a postPRS signal 1260, 1270 containing the calculated RTT of the signals to each other (as well as send to any other participating UEs, such additional targets). From the measured RTT of the signals, each of the UEs (e.g., UE 1 1202 and UE 2 1204) can calculate their distance (ranging) from one another and position themselves accordingly 1280, 1290. From the calculated RTT of the signals, UE 1 1202 can estimate the distance to UE 2 1204 and position itself with respect to UE 2 1204. From the calculated RTT of the signals, UE 2 1204 can estimate the distance to UE 1 1202 and position itself with respect to UE 1 1202. The postPRS signals 1260, 1270 may be sent (transmitted) within a licensed C-V2X frequency band.

FIG. 13 is a table 1300 of example priorities for synchronization references for sidelink PRS-driven synchronization source selection for vehicle-based communications (e.g., C-V2X communications), in accordance with some aspects of the present disclosure. Currently, 3GPP standards has defined priorities for SLSS Sync Ref selection. Table 1300 of FIG. 13 shows priorities for SLSS Sync Ref selection for example cases (e.g., case 1, case 2, and case 3) 1310, 1320, 1330, which are outlined by the current 3GPP standards. For each of the cases (e.g., case 1, case 2, and case 3) 1310, 1320, 1330, priorities for selecting a Sync Ref are listed from the highest priority (e.g., P0) to the lowest priority (e.g., P7). It should be noted that, in one or more embodiments, during the prePRS phase of the communication exchanges 1100, 1200 of FIGS. 11 and 12, the UEs may choose their initial Sync Ref by following the priorities as shown in table 1300 of FIG. 13.

In table 1300 of FIG. 13, for the first case 1310 for GNSS-based synchronization, the initial priority (P0) is to select GNSS, the first priority (P1) is to select a UE directly synchronized to GNSS, the sixth priority (P6) is to select the remaining UEs that have the lowest priority, and the seventh priority (P7) is to select the UE's own internal clock.

For the second case 1320 for GNSS-based synchronization of the table 1300 of FIG. 13, the initial priority (P0) is to select GNSS, the first priority (P1) is to select a UE directly synchronized to GNSS, the second priority (P2) is to select a UE indirectly synchronized to GNSS, the third priority (P3) is to select an eNB, the fourth priority (P4) is to select a UE directly synchronized to an eNB, the fifth priority (P5) is to select a UE indirectly synchronized to an eNB, the sixth priority (P6) is to select the remaining UEs that have the lowest priority, and the seventh priority (P7) is to select the UE's own internal clock.

For the third case 1330 for eNB-based synchronization of the table 1300 of FIG. 13, the initial priority (P0') is to select an eNB, the first priority (P1') is to select a UE directly synchronized to an eNB, the second priority (P2') is to select a UE indirectly synchronized to an eNB, the third priority (P3') is to select GNSS, the fourth priority (P4') is to select a UE directly synchronized to an GNSS, the fifth priority (P5') is to select a UE indirectly synchronized to GNSS, the sixth priority (P6') is to select the remaining UEs that have the lowest priority, and the seventh priority (P7') is to select the UE's own internal clock.

FIG. 14 is a flow diagram illustrating an example of a process 1400 for sidelink PRS-driven synchronization source selection for vehicle-based communications (e.g., C-V2X communications), in accordance with some aspects of the present disclosure. As shown in FIG. 14, there is a single initiator (e.g., UE 1) 1402 and a single target (e.g., UE 2) 1404. The process 1400 can be used to determine a preferred or master Sync Ref between the initiator 1402 and the target 1404 for at least a duration of a positioning session during which the initiator 1402 and target 1404 are performing sidelink positioning.

Block 1405 indicates the start of the process 1400. During the prePRS phase of the process 1400, the initiator 1402 may send (transmit) a prePRS signal (e.g., a Sync Ref negotiation signal) to the target 1404 with information associated with a Sync Ref initially selected or determined by the initiator 1402. For example, the prePRS signal may include a priority of the Sync Ref initially chosen by the initiator 1402, an INC indicator, and an identification (e.g., a Layer 2 address) of the Sync Ref initially chosen by the initiator 1402. In one or more examples, the initiator 1402 may initially select the Sync Ref by following the priorities as shown in table 1300 of FIG. 13. The prePRS signal can act as a proposal from the initiator 1402 to the target 1404 to use the Sync Ref selected or determined by the initiator 1402 as the preferred or master Sync Ref between the initiator 1402 and the target 1404.

After the target 1404 receives the prePRS signal from the initiator 1402, at block 1410, the target 1404 may determine whether it can detect the initiator's Sync Ref (e.g., whether the initiator's Sync Ref is within a communication range of the target 1404). If the target 1404 determines it can detect the initiator's Sync Ref, the target 1404 can latch onto the initiator's Sync Ref (e.g., by using the initiator's Sync Ref as its Sync Ref).

In some aspects, if the initiator's Sync Ref has the same priority (e.g., according to table 1300 of FIG. 13) as the target's Sync Ref, the target 1404 can switch to using the Sync Ref of the initiator 1402. In some cases, the target 1404 can switch to the Sync Ref of the initiator 1402 even if the initiator's Sync Ref has a lower power (e.g., sidelink Reference Signal Received Power (S-RSRP)) than that of the Sync Ref of the target 1404, for example as long as the power (e.g., the S-RSRP) of the initiator's Sync Ref is above a minimum required threshold. In some aspects, if the Sync Ref of the initiator 1402 has a lower priority (e.g., according to table 1300 of FIG. 13) than the Sync Ref of the target 1404, the target 1404 can still switch to using the initiator's Sync Ref. In any case, the target 1404 may confirm the initiator's proposal to use the Sync Ref of the initiator 1402 as the preferred or master Sync Ref, such as by transmitting a message confirming the proposal. In some examples, as described below; the target 1404 may propose its own Sync Ref to be used as the preferred Sync Ref for the target 1404 and the initiator 1402.

If the target 1404 determines that the target 1404 can detect the initiator's Sync Ref, the target 1404 may send (transmit) a prePRS response signal (e.g., prePRS response message 1) to the initiator 1402 confirming that the initiator's Sync Ref will now be utilized as the master Sync Ref for both the target 1404 and the initiator 1402.

However, if the target 1404 determines that the target 1404 cannot detect the initiator's Sync Ref, at block 1415, the Sync Ref of the target 1404, the initiator 1402 itself, or the target 1404 itself may be chosen as the master Sync Ref. In either case, the target 1404 may send (transmit) a prePRS response signal (e.g., prePRS response message 1) to the initiator 1402 proposing a new master Sync Ref (e.g., the target's Sync Ref or the initiator 1402 itself, if the initiator 1402 is a Sync Ref UE) to be used by both the target 1404 and the initiator 1402. The prePRS response signal may include a priority of the proposed new master Sync Ref, an INC indicator, and an identification (e.g., a Layer 2 address) of the proposed new master Sync Ref.

At block 1420, the initiator 1402 determines whether the target 1404 confirmed the Sync Ref of the initiator 1402 as the master Sync Ref. If the initiator 1402 can confirm (e.g., detect) that the target 1404 confirmed the Sync Ref of the initiator 1402 as the master Sync Ref, at block 1425, the initiator 1402 and the target 1404 may agree on using the Sync Ref of the initiator 1402 as the master Sync Ref.

However, if the initiator 1402 determines the target 1404 did not confirm the Sync Ref of the initiator 1402 as the master Sync Ref or cannot determine that the target 1404 confirmed the initiator's Sync Ref, at block 1430, the initiator 1402 may determine whether it can detect the Sync Ref of the target 1404 (e.g., whether the target's Sync Ref is within a communication range of the initiator 1402). If the initiator 1402 can detect the target's Sync Ref, the initiator 1402 may send (transmit) a prePRS response signal (e.g., a prePRS response message 2) to the target 1404 confirming the target's Sync Ref as the master Sync Ref. Then, at block 1435, the initiator 1402 and the target 1404 may agree on using the target's Sync Ref as the master Sync Ref.

If the initiator 1402 cannot detect the target's Sync Ref, at block 1440, the initiator 1402 may determine whether the target 1404 proposed the initiator 1402 itself as the master Sync Ref. For instance, as noted above, synchronization signals may be transmitted (e.g., via a medium access control-control element (MAC-CE), a V2X layer message, and/or an application layer message) by a synchronization source to one or more other devices so that the other device(s) can determine whether to choose the synchronization source as a synchronization reference source, such as based on the priorities shown in FIG. 13. For instance, the initiator 1402 can transmit synchronization signals to the target 1404 with information associated with the initiator

1402 as a synchronization source (e.g., an address or identifier of the initiator 1402, such as a Layer 2 address, a priority of the initiator 1402 as the synchronization source, an INC indicator, etc.). Using the synchronization signals, the target 1404 can be aware that the initiator 1402 is a synchronization source and can transmit a message (e.g., Pre-PRS response msg1) proposing the initiator 1402 to be used as the master Sync Ref. If the initiator 1402 determines that the target 1404 proposed the initiator 1402 as the master Sync Ref (e.g., based on receiving the Pre-PRS response msg1 proposing the initiator 1402 to be used as the master Sync Ref), the initiator 1402 may send (transmit) a prePRS response signal (e.g., prePRS response message 2) to the target 1404 confirming the initiator 1402 as the master Sync Ref. Then, at block 1435, the initiator 1402 and the target 1404 may agree on using the initiator 1402 as the master Sync Ref.

If the initiator 1402 cannot determine that the target 1404 proposed the initiator 1402 as the master Sync Ref, at block 1445, the initiator 1402 may determine whether the target 1404 is a Sync Ref itself. For example, using synchronization signals received from the target 1404, the initiator 1402 can be aware that the target 1404 is a synchronization source. If the initiator 1402 can determine that the target 1404 is a Sync Ref (e.g., based on synchronization signals received from the target 1404), the initiator 1402 may send (transmit) a prePRS response signal (e.g., prePRS response message 2) to the target 1404 proposing the target 1404 as the master Sync Ref. In response, the target 1404 may send (transmit) a prePRS response signal (e.g., prePRS response message 3) to the initiator 1402 confirming the target 1404 as the master Sync Ref. Then, at block 1450, the initiator and the target may agree on using the target 1404 as the master Sync Ref.

If the initiator 1402 cannot determine that the target 1404 is a Sync Ref, the initiator 1402 and the target 1404 may use their own original initial Sync Refs at block 1455.

FIG. 15 is a flow diagram illustrating an example of a process 1500 for sidelink PRS-driven synchronization source selection for vehicle-based communications (e.g., C-V2X communications), in accordance with some aspects of the present disclosure. As shown in FIG. 15, there is a single initiator (e.g., UE 1) 1502 and N number of targets (e.g., UEs 2, 3, 4 . . . . N+1) 1504. The process 1500 can be used to determine a preferred or master Sync Ref between the initiator 1502 and the target(s) 1504 for at least a duration of a positioning session during which the initiator 1502 and target(s) 1504 are performing sidelink positioning.

Block 1505 indicates the start of the process 1500. During the prePRS phase, the initiator 1502 may send (transmit) a prePRS signal (e.g., a Sync Ref negotiation signal) to the target(s) 1504 with information associated with a Sync Ref initially selected or determined by the initiator 1502. For example, the prePRS signal may include a priority of the Sync Ref initially chosen by the initiator 1502, an INC indicator, and an identification (e.g., a Layer 2 address) of the Sync Ref initially chosen by the initiator 1502. In one or more examples, the initiator 1502 may initially select the Sync Ref by following the priorities as shown in table 1300 of FIG. 13. Similar to that described above with respect to FIG. 14, the prePRS signal can act as a proposal from the initiator 1502 to the target 1504 to use the Sync Ref selected or determined by the initiator 1502 as the preferred or master Sync Ref between the initiator 1502 and the target 1504.

After the target(s) 1504 receives the prePRS signal from the initiator 1502, at block 1510, the target(s) 1504 may determine whether the target(s) 1504 can detect the initiator's Sync Ref (e.g., whether the initiator's Sync Ref is within communication range of the target(s) 1504) and the target(s) 1504 can latch onto the initiator's Sync Ref (e.g., by using the initiator's Sync Ref as its/their Sync Ref).

In some cases, if the Sync Ref of the initiator 1502 has the same priority (e.g., according to table 1300 of FIG. 13) as one or more Sync Refs of the target 1504, the target(s) 1504 may switch to using the Sync Ref of the initiator 1502. In some cases, the target 1504 can switch to the Sync Ref of the initiator 1502 even if the initiator's Sync Ref has a lower power (e.g., S-RSRP) than that of the Sync Ref(s) of the target(s) 1504, for example as long as the power (e.g., the S-RSRP) of the initiator's Sync Ref is above a minimum required threshold. In some aspects, if the Sync Ref of the initiator 1502 has a lower priority (e.g., according to table 1300 of FIG. 13) than the Sync Ref(s) of the target(s) 1504, the target(s) 1504 may still switch to using the initiator's Sync Ref. In any case, the target(s) 1504 may confirm the initiator's proposal to use the Sync Ref of the initiator 1502 as the preferred or master Sync Ref, such as by transmitting one or more messages confirming the proposal. In some examples, the target(s) 1504 may propose one or more of their own Sync Refs to be used as the preferred Sync Ref for the target(s) 1504 and the initiator 1402.

If the target(s) 1504 determines that the target(s) 1504 can detect the initiator's Sync Ref, the target(s) 1504 may send (transmit) a prePRS response signal (e.g., prePRS response message 1) to the initiator 1502 confirming that the initiator's Sync Ref will now be utilized as the master Sync Ref for the target(s) 1504 and the initiator 1502.

However, if the target(s) 1504 determines that the target(s) 1504 cannot detect the initiator's Sync Ref, at block 1515, the target(s) 1504 may determine whether the initiator 1502 is a Sync Ref itself. For instance, as described above, synchronization signals may be transmitted (e.g., via a medium access control-control element (MAC-CE), a V2X layer message, and/or an application layer message) by a synchronization source to one or more other devices so that the other device(s) can determine whether to choose the synchronization source as a synchronization reference source, such as based on the priorities shown in FIG. 13. For instance, the initiator 1502 may transmit synchronization signals to the target(s) 1504 with information associated with the initiator 1502 as a synchronization source (e.g., an address or identifier of the initiator 1502, such as a Layer 2 address, a priority of the initiator 1502 as the synchronization source, an INC indicator, etc.). Using the synchronization signals, the target(s) 1504 can be aware that the initiator 1502 is a synchronization source. If the target(s) 1504 can determine that the initiator 1502 is itself a Sync Ref (e.g., based on one or more synchronization signals received from the initiator 1502), the target(s) 1504 may send (transmit) a prePRS response signal (e.g., prePRS response message 1) to the initiator 1502 proposing the initiator 1502 as the master Sync Ref to be used by the target(s) 1504 and the initiator 1502. If the target(s) 1504 cannot determine that the initiator 1502 is a Sync Ref itself, at block 1525 (e.g., no synchronization signals have been received from the initiator 1502), the initiator 1502 and the target(s) 1504 may use their own original Sync Refs. As described herein, the synchronization signals and/or the prePRS response signal may include a priority of the proposed new master Sync Ref, an INC indicator, and an identification (e.g., a Layer 2 address) of the proposed new master Sync Ref.

At block 1520, the initiator 1502 may determine whether the target(s) 1504 confirmed the Sync Ref of the initiator 1502 as the master Sync Ref. If the initiator 1502 can determine or confirm that the target(s) 1504 confirmed the initiator's Sync Ref as the master Sync Ref, at block 1530, the initiator 1502 and the target(s) 1504 may agree on the Sync Ref of the initiator 1502 as the master Sync Ref.

However, if the initiator 1502 determines the target(s) 1504 did not confirm the Sync Ref of the initiator 1502 as the master Sync Ref or cannot determine that the target(s) 1504 confirmed the initiator's Sync Ref, at block 1535, the initiator 1502 may determine whether the target(s) 1504 proposed the initiator 1502 as the master Sync Ref. If the initiator 1502 can determine that the target(s) 1504 proposed the initiator 1502 as the master Sync Ref, the initiator 1502 may send (transmit) a prePRS response signal (e.g., prePRS response message 2) to the target(s) 1504 confirming the initiator 1502 as the master Sync Ref. Then, at block 1540, the initiator 1502 and the target(s) 1504 may agree on the master Sync Ref.

If the initiator 1502 cannot determine that the target(s) 1504 proposed the initiator 1502 as the master Sync Ref, at block 1545, the initiator 1502 and the target(s) 1504 may use their own original Sync Refs.

It should be noted that, although the process 1500 of FIG. 15 requires at certain blocks (e.g., blocks 1510, 1520, 1535) that all of the targets 1504 be in agreement, in one or more embodiments, if one portion of the targets 1504 are in agreement and the remaining targets 1504 are not in agreement, the process 1500 as shown in FIG. 15 can simply proceed for the portion of targets 1504 that are in agreement, and the remaining targets 1504 not in agreement can simply just use their own original Sync Refs (e.g., proceed directly to blocks 1525 or 1545).

Figure 16:
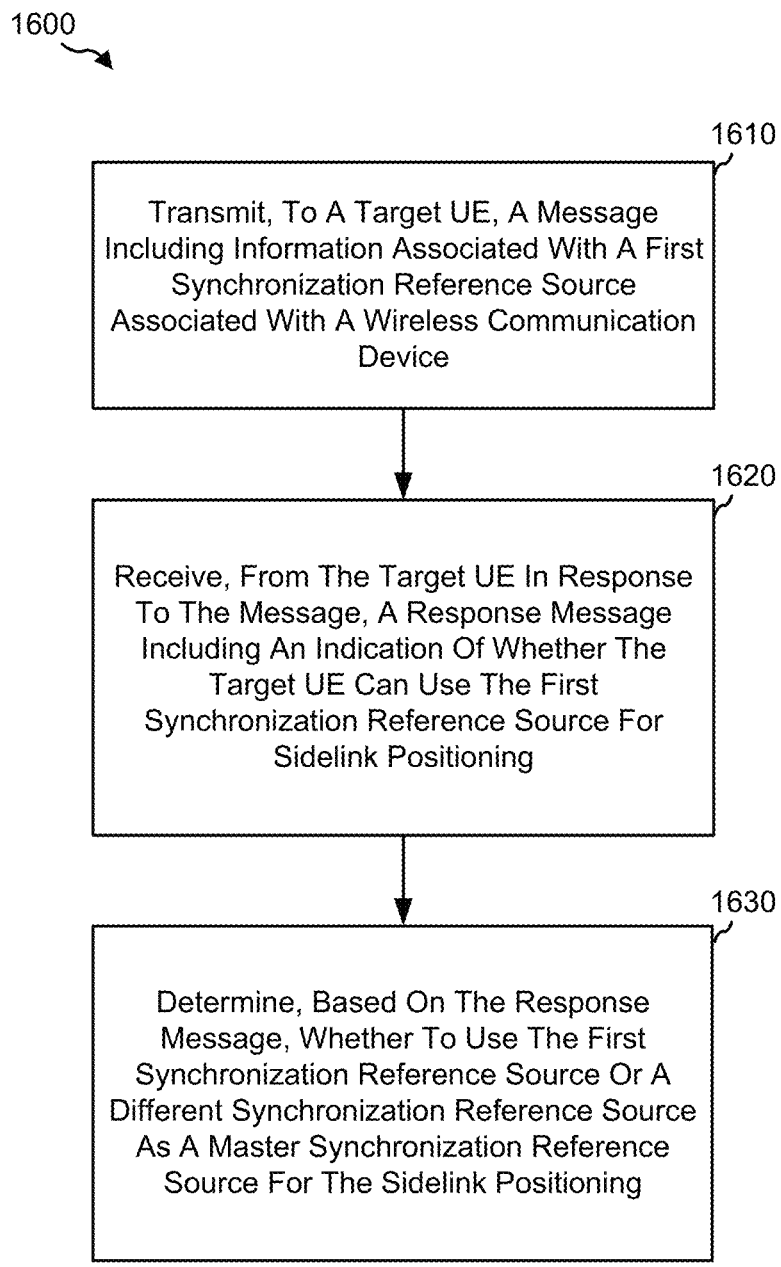
FIG. 16 is a flow diagram illustrating an example of a process for providing sidelink synchronization source selection for communications (e.g., C-V2X communications), in accordance with some aspects of the present disclosure.

FIG. 16 is a flow diagram illustrating an example of a process 1600 for wireless communications. The process 1600 can provide sidelink synchronization source selection (e.g., based on PRS or other reference signal(s)) for communications (e.g., C-V2X communications), in accordance with some aspects of the present disclosure. The process 1600 can be performed by a computing device or apparatus, such as a wireless communications device (e.g., a UE, such as an initiator UE) or a component or system (e.g., a chipset) of the wireless communication device. The operations of the process 1600 may be implemented as software components that are executed and run on one or more processors (e.g., transmit processor 316 of FIG. 3A, controller/processor(s) 375 of FIG. 3A, receive processor 370 of FIG. 3A, receive processor 356 of FIG. 3A, controller/processor(s) 359 of FIG. 3A, transmit processor 368 of FIG. 3A, control system 552 of FIG. 5, processor(s) 684 of FIG. 6, application processor 1806 of FIG. 18, and/or other processor(s)). Further, the transmission and reception of signals by the wireless communications device in the process 1600 may be enabled, for example, by one or more antennas, transceivers, processors, etc. (e.g., transmitter/receiver 318TX/RX of FIG. 3A, transmit processor 316 of FIG. 3A, receive processor 370 of FIG. 3A, antenna 320 of FIG. 3A, transmitter/receiver 354TX/RX of FIG. 3A, transmit processor 368 of FIG. 3A, receive processor 356 of FIG. 3A, antenna 352 of FIG. 3A, an antenna, transceiver, or other component of the vehicle computing system 550 of FIG. 5, the wireless transceiver(s) 678 of FIG. 6, the antenna 687 of FIG. 6, the DSP 682 of FIG. 6, the cellular RF transceiver 1822 of FIG. 18, the transmission component 1834 of FIG. 18, the cellular baseband processor 1804 of FIG. 18, etc.).

At block 1610, the wireless communication device (or component thereof) may transmit, to a target UE, a message including information associated with a first synchronization reference source associated with the wireless communication device. In some cases, the information associated with the first synchronization reference source associated with the wireless communication device includes a priority and an address (e.g., a Layer2 address) of the first synchronization reference source. In some cases, the wireless communication device is a first vehicle and the target UE is a second vehicle that are configured to communicate using a cellular-vehicle-to-everything (C-V2X) protocol. In one illustrative example, the message may include the pre-PRS message of FIG. 14 transmitted by the initiator 1402 to the target 1404 with information associated with a synchronization reference source initially selected or determined by the initiator 1402. In another illustrative example, the message may include the pre-PRS message of FIG. 15 transmitted by the initiator 1502 to the target 1504, as described previously.

At block 1620, the wireless communication device (or component thereof) may receive, from the target UE in response to the message, a response message including an indication of whether the target UE can use the first synchronization reference source for sidelink positioning. In one illustrative example, the message may include one of the pre-PRS response messages shown in FIG. 14 transmitted by the target 1404 to the initiator 1402, as described previously. In another illustrative example, the message may include one of the pre-PRS response messages shown in FIG. 15 transmitted by the target 1504 to the initiator 1502.

At block 1630, the wireless communication device (or component thereof) may determine, based on the response message, whether to use the first synchronization reference source or a different synchronization reference source (e.g., the target UE, the wireless communication device itself, another target UE, etc.) as a master synchronization reference source for the sidelink positioning.

In some cases, the indication included in the response message includes a confirmation that the target UE can use the first synchronization reference source for the sidelink positioning. In such cases, the wireless communication device (or component thereof) may use the first synchronization reference source as the master synchronization reference source for the sidelink positioning based on the confirmation in the response message that the target UE can use the first synchronization reference source for the sidelink positioning (e.g., as described with respect to block 1425 of FIG. 14 and block 1530 of FIG. 15).

In some aspects, the indication included in the response message includes a confirmation that the target UE can use the first synchronization reference source for the sidelink positioning. In such aspects, the wireless communication device (or component thereof) may receive, from at least one additional target UE, at least one additional response message including confirmation that the at least one additional target UE can use the first synchronization reference source for sidelink positioning. For instance, referring to block 1520 of FIG. 15 as an illustrative example, all of the targets may confirm that they can use the initiator's synchronization reference source for sidelink positioning. The wireless communication device (or component thereof) may use the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning (e.g., as described with respect to block 1530 of FIG. 15).

In some examples, the indication included in the response message includes a proposal of a second synchronization reference source associated with the target UE as the master synchronization reference source for the sidelink positioning. For instance, referring to FIG. 14, the target 1404 may propose a synchronization reference source with which it is associated for sidelink positioning. In such examples, determining whether to use the first synchronization reference source or the different synchronization reference source as the master synchronization reference source may include determining whether the wireless communication device can use the second synchronization reference source for the sidelink positioning (e.g., based on whether the wireless communication device can wirelessly detect the second synchronization reference source). The wireless communication device (or component thereof) may use the second synchronization reference source as the master synchronization reference source for the sidelink positioning based on determining that the wireless communication device can use the second synchronization reference source for the sidelink positioning (e.g., as described with respect to block 1430 of FIG. 14).

In some aspects, the indication included in the response message includes a proposal to use the wireless communication device as the master synchronization reference source for the sidelink positioning. For instance, as described with respect to FIG. 14, the target 1404 may transmit a pre-PRS response message proposing the initiator 1402 as the master synchronization reference source for the sidelink positioning. A similar example is described with respect to FIG. 15. The target 1404 (or target 1504) may be aware that the initiator 1402 (or initiator 1502) is itself a synchronization reference source for sidelink positioning based on synchronization signals periodically or occasionally transmitted from the initiator 1402 (or initiator 1502) to the target 1404 (or target 1504). As noted above, synchronization signals may be transmitted (e.g., via a medium access control-control element (MAC-CE), a V2X layer message, and/or an application layer message) by a synchronization source to one or more other devices so that the other device(s) can determine whether to choose the synchronization source as a synchronization reference source, such as based on the priorities shown in FIG. 13. For instance, the initiator 1402 can transmit synchronization signals to the target 1404 with information associated with the initiator 1402 as a synchronization source (e.g., an address or identifier, such as a Layer 2 address, a priority of the synchronization source, etc.). Using the synchronization signals, the target 1404 can be aware that the initiator 1402 is a synchronization source. In such aspects, the wireless communication device (or component thereof) may transmit, to the target UE, an additional message including confirmation of the wireless communication device as the master synchronization reference source for the sidelink positioning (e.g., the initiator 1402/1502 transmitting the pre-PRS response message 2 (msg2) to target 1404/1504, as show in FIG. 14 and FIG. 15).

In some cases, the wireless communication device (or component thereof) may determine that the target UE is a synchronization reference source. For instance, the wireless communication device (e.g., the initiator 1402 or initiator 1502) may be aware that the target UE (e.g., the target 1404 or one of the targets 1504) is itself a synchronization reference source for sidelink positioning based on synchronization signals periodically or occasionally transmitted from the target UE to the wireless communication device. In such cases, the wireless communication device (or component thereof) may transmit, to the target UE, an additional message including a proposal (e.g., the Pre-PRS response msg2 of FIG. 14) to use the target UE as the master synchronization reference source for the sidelink positioning. In some aspects, the wireless communication device (or component thereof) may receive, from the target UE, an additional response message (e.g., the pre-PRS response msg3 of FIG. 14) including confirmation of the target UE as the master synchronization reference source for the sidelink positioning.

Figure 17:
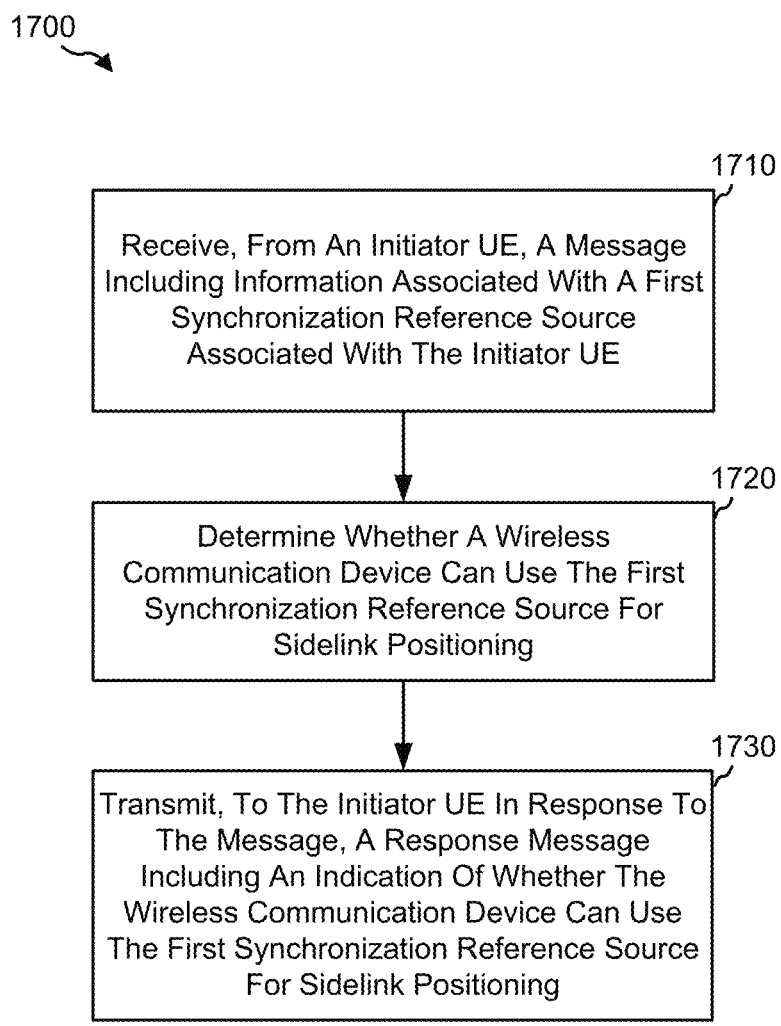
FIG. 17 is a flow diagram illustrating another example of a process for providing sidelink synchronization source selection for communications (e.g., C-V2X communications), in accordance with some aspects of the present disclosure.

FIG. 17 is a flow diagram illustrating another example of a process 1700 for wireless communications. The process 1700 can provide sidelink synchronization source selection (e.g., based on PRS or other reference signal(s)) for communications (e.g., C-V2X communications), in accordance with some aspects of the present disclosure. The process 1700 can be performed by a computing device or apparatus, such as a wireless communications device (e.g., a UE, such as a target UE) or a component or system (e.g., a chipset) of the wireless communication device. The operations of the process 1700 may be implemented as software components that are executed and run on one or more processors (e.g., transmit processor 316 of FIG. 3A, controller/processor(s) 375 of FIG. 3A, receive processor 370 of FIG. 3A, receive processor 356 of FIG. 3A, controller/processor(s) 359 of FIG. 3A, transmit processor 368 of FIG. 3A, control system 552 of FIG. 5, processor(s) 684 of FIG. 6, application processor 1806 of FIG. 18, and/or other processor(s)). Further, the transmission and reception of signals by the wireless communications device in the process 1700 may be enabled, for example, by one or more antennas, transceivers, processors, etc. (e.g., transmitter/receiver 318TX/RX of FIG. 3A, transmit processor 316 of FIG. 3A, receive processor 370 of FIG. 3A, antenna 320 of FIG. 3A, transmitter/receiver 354TX/RX of FIG. 3A, transmit processor 368 of FIG. 3A, receive processor 356 of FIG. 3A, antenna 352 of FIG. 3A, an antenna, transceiver, or other component of the vehicle computing system 550 of FIG. 5, the wireless transceiver(s) 678 of FIG. 6, the antenna 687 of FIG. 6, the DSP 682 of FIG. 6, the cellular RF transceiver 1822 of FIG. 18, the transmission component 1834 of FIG. 18, the cellular baseband processor 1804 of FIG. 18, etc.).

At block 1710, the wireless communication device (or component thereof) may receive, from an initiator UE, a message including information associated with a first synchronization reference source associated with the initiator UE. In some cases, the information associated with the first synchronization reference source associated with the initiator UE includes a priority and an address (e.g., a Layer2 address) of the first synchronization reference source. In some cases, the wireless communication device is a first vehicle and the initiator UE is a second vehicle that are configured to communicate using a cellular-vehicle-to-everything (C-V2X) protocol. In one illustrative example, the message may include the pre-PRS message of FIG. 14 transmitted by the initiator 1402 to the target 1404 with information associated with a synchronization reference source initially selected or determined by the initiator 1402. In another illustrative example, the message may include the pre-PRS message of FIG. 15 transmitted by the initiator 1502 to the target 1504, as described previously.

At block 1720, the wireless communication device (or component thereof) may determine whether the wireless communication device can use the first synchronization reference source for sidelink positioning. For instance, as described herein, determining whether the wireless communication device can use the first synchronization reference source for the sidelink positioning may be based on whether the wireless communication device can wirelessly detect the first synchronization reference source (e.g., whether the first synchronization source is within communication range of the wireless communication device).

At block 1730, the wireless communication device (or component thereof) may transmit, to the initiator UE in response to the message, a response message including an indication of whether the wireless communication device can use the first synchronization reference source as a master synchronization reference source for sidelink positioning.

In some aspects, the indication included in the response message includes a confirmation that the wireless communication device can use the first synchronization reference source for the sidelink positioning. In such aspects, the wireless communication device (or component thereof) may us the first synchronization reference source as the master synchronization reference source for the sidelink positioning based on the confirmation that the wireless communication device can use the first synchronization reference source for the sidelink positioning (e.g., as described with respect to block 1425 of FIG. 14 and block 1530 of FIG. 15).

In some cases, the indication included in the response message includes a confirmation that the wireless communication device can use the first synchronization reference source for the sidelink positioning. In such cases, the wireless communication device (or component thereof) may use the first synchronization reference source as the master synchronization reference source for the sidelink positioning based on the confirmation that the wireless communication device can use the first synchronization reference source for the sidelink positioning and based on confirmation that at least one additional UE can use the first synchronization reference source for sidelink positioning. For instance, referring to block 1520 of FIG. 15 as an illustrative example, all of the targets may confirm that they can use the initiator's synchronization reference source for sidelink positioning (e.g., as described with respect to block 1530 of FIG. 15).

In some examples, the indication included in the response message includes a proposal of a second synchronization reference source associated with the wireless communication device as the master synchronization reference source for the sidelink positioning. For instance, referring to FIG. 14, the target 1404 may propose a synchronization reference source with which it is associated for sidelink positioning. In such examples, the wireless communication device (or component thereof) may receive, from the initiator UE, an additional message including confirmation of the second synchronization reference source as the master synchronization reference source for the sidelink positioning. The wireless communication device (or component thereof) may use the second synchronization reference source as the master synchronization reference source for the sidelink positioning based on receiving the additional message including the confirmation of the second synchronization reference source as the master synchronization reference source for the sidelink positioning (e.g., as described with respect to block 1430 and block 1435 of FIG. 14).

In some aspects, the wireless communication device (or component thereof) may determine, at the wireless communication device, that the initiator UE is a synchronization reference source. In such aspects, the indication included in the response message includes a proposal to use the initiator UE as the master synchronization reference source for the sidelink positioning. The wireless communication device (or component thereof) may receive, from the initiator UE, an additional message including confirmation of the initiator UE as the master synchronization reference source for the sidelink positioning. For instance, as described with respect to FIG. 14, the target 1404 may transmit a pre-PRS response message proposing the initiator 1402 as the master synchronization reference source for the sidelink positioning. A similar example is described with respect to FIG. 15. The target 1404 (or target 1504) may be aware that the initiator 1402 (or initiator 1502) is itself a synchronization reference source for sidelink positioning based on synchronization signals periodically or occasionally transmitted from the initiator 1402 (or initiator 1502) to the target 1404 (or target 1504). As noted above, synchronization signals may be transmitted (e.g., via a medium access control-control element (MAC-CE), a V2X layer message, and/or an application layer message) by a synchronization source to one or more other devices so that the other device(s) can determine whether to choose the synchronization source as a synchronization reference source, such as based on the priorities shown in FIG. 13. For instance, the initiator 1402 can transmit synchronization signals to the target 1404 with information associated with the initiator 1402 as a synchronization source (e.g., an address or identifier, such as a Layer 2 address, a priority of the synchronization source, etc.). Using the synchronization signals, the target 1404 can be aware that the initiator 1402 is a synchronization source.

In some cases, the wireless communication device (or component thereof) may receive, from the initiator UE, an additional message (e.g., the Pre-PRS response msg2 of FIG. 14) including a proposal to use the wireless communication device (e.g., target UE 1404) as the master synchronization reference source for the sidelink positioning. For instance, the initiator 1402 or initiator 1502 may be aware that the target UE (e.g., the target 1404 or one of the targets 1504) is itself a synchronization reference source for sidelink positioning based on synchronization signals periodically or occasionally transmitted from the target UE to the wireless communication device. The wireless communication device (or component thereof) may transmit, to the initiator UE, an additional response message (e.g., the pre-PRS response msg3 of FIG. 14) including confirmation of the wireless communication device as the master synchronization reference source for the sidelink positioning.

Figure 18:
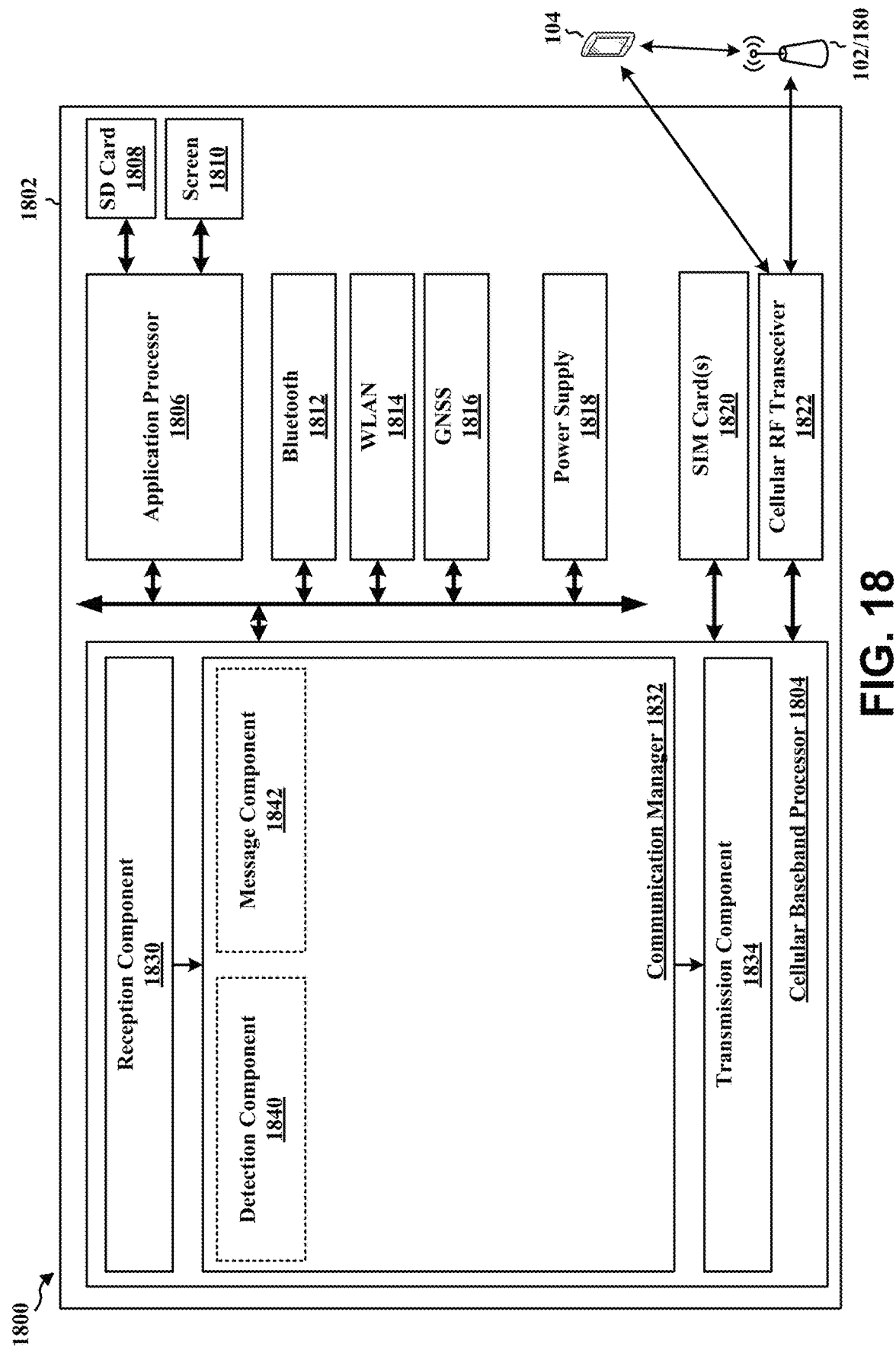
FIG. 18 is a diagram illustrating an example of a hardware implementation for an example apparatus, in accordance with some aspects of the present disclosure.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a GNSS module 1816, and a power supply 1818. The GNSS module 1816 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 1804 communicates through the cellular RF transceiver 1822 with the UE 104 of FIG. 1 and/or BS 102/180 of FIG. 1. The cellular baseband processor 1804 may include a computer-readable medium/memory. The computer-readable medium/memory may be non-transitory. The cellular baseband processor 1804 is responsible for general processing, including the execution of software stored on the computer-readable medium/ memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components, including a detection component 1840 configured to detect one or more objects and a message component 1842 configured to generate one or more messages (e.g., SDSMs, CPMs, BSMs, etc.). The components within the communication manager 1832 may be stored in the computer-readable medium/memory and/or configured as hardware within the cellular baseband processor 1804. The cellular baseband processor 1804 may be a component of the wireless communications device 310 or the wireless communications device 350 of FIG. 3A. For example, the cellular baseband processor 1804 may include the memory 360 of FIG. 3A and/or at least one of the TX processor 368 of FIG. 3A, the RX processor 356 of FIG. 3A, and the controller/processor 359 of FIG. 3A. In one configuration, the apparatus 1802 may be a modem chip and include just the baseband processor 1804, and in another configuration, the apparatus 1802 may be an entire UE (e.g., the wireless communication device 310 or 350 of FIG. 3A) and include the previously-discussed additional components of the apparatus 1802.

The apparatus 1802 may include additional components that perform each of the blocks of the processes or algorithms in one or more of the aforementioned diagrams of FIGS. 11, 12, and 14-17. As such, each block of the aforementioned processes or algorithms in one or more of the aforementioned diagrams of FIGS. 11, 12, and 14-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802 includes means for transmitting, from a UE to a target UE, a message including information associated with a first synchronization reference source associated with the UE; means for receiving, at the UE from the target UE in response to the message, a response message including an indication of whether the target UE can use the first synchronization reference source for sidelink positioning; and means for determining, at the UE based on the response message, whether to use the first synchronization reference source or a different synchronization reference source as a master synchronization reference source for the sidelink positioning. The means can include one or more of the components of the apparatus 1802 or other devices described herein (e.g., the wireless communication device 310 of FIG. 3A, the wireless communication device 350 of FIG. 3A, the vehicle computing system 550 of FIG. 5, the user device computing system 670 of FIG. 6, etc.). For example, the means for performing the various operations may include one or more of transmitter/receiver 318TX/RX of FIG. 3A, transmit processor 316 of FIG. 3A, controller/processor(s) 375 of FIG. 3A, receive processor 370 of FIG. 3A, antenna 320 of FIG. 3A, transmitter/receiver 354TX/RX of FIG. 3A, receive processor 356 of FIG. 3A, controller/processor(s) 359 of FIG. 3A, transmit processor 368 of FIG. 3A, antenna 352 of FIG. 3A, control system 552 of FIG. 5, an antenna, transceiver, or other component of the vehicle computing system 550 of FIG. 5, processor(s) 684 of FIG. 6, the wireless transceiver(s) 678 of FIG. 6, the antenna 687 of FIG. 6, the DSP 682 of FIG. 6, application processor 1806 of FIG. 18, the cellular RF transceiver 1822 of FIG. 18, the transmission component 1834 of FIG. 18, the cellular baseband processor 1804 of FIG. 18, etc.).

In another configuration, the apparatus 1802 includes means for receiving, at the UE from an initiator UE, a message including information associated with a first synchronization reference source associated with the initiator UE; means for determining whether the UE can use the first synchronization reference source for sidelink positioning; and means for transmitting, from the UE to the initiator UE in response to the message, a response message including an indication of whether the UE can use the first synchronization reference source as a master synchronization reference source for sidelink positioning. The means can include one or more of the components of the apparatus 1802 or other devices described herein (e.g., the wireless communication device 310 of FIG. 3A, the wireless communication device 350 of FIG. 3A, the vehicle computing system 550 of FIG. 5, the user device computing system 670 of FIG. 6, etc.). For example, the means for performing the various operations may include one or more of transmitter/receiver 318TX/RX of FIG. 3A, transmit processor 316 of FIG. 3A, controller/processor(s) 375 of FIG. 3A, receive processor 370 of FIG. 3A, antenna 320 of FIG. 3A, transmitter/receiver 354TX/RX of FIG. 3A, receive processor 356 of FIG. 3A, controller/processor(s) 359 of FIG. 3A, transmit processor 368 of FIG. 3A, antenna 352 of FIG. 3A, control system 552 of FIG. 5, an antenna, transceiver, or other component of the vehicle computing system 550) of FIG. 5, processor(s) 684 of FIG. 6, the wireless transceiver(s) 678 of FIG. 6, the antenna 687 of FIG. 6, the DSP 682 of FIG. 6, application processor 1806 of FIG. 18, the cellular RF transceiver 1822 of FIG. 18, the transmission component 1834 of FIG. 18, the cellular baseband processor 1804 of FIG. 18, etc.).

Specific details are provided in the description above to provide a thorough understanding of the aspects and examples provided herein, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual examples may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method for wireless communications at a user equipment (UE), the method comprising: transmitting, from the UE to a target UE, a message including information associated with a first synchronization reference source associated with the UE: receiving, at the UE from the target UE in response to the message, a response message including an indication of whether the target UE can use the first synchronization reference source for sidelink positioning; and determining, at the UE based on the response message, whether to use the first synchronization reference source or a different synchronization reference source as a master synchronization reference source for the sidelink positioning.

Aspect 2. The method of Aspect 1, wherein the indication included in the response message includes a confirmation that the target UE can use the first synchronization reference source for the sidelink positioning, and further comprising: using the first synchronization reference source as the master synchronization reference source for the sidelink positioning based on the confirmation in the response message that the target UE can use the first synchronization reference source for the sidelink positioning.

Aspect 3. The method of any of Aspects 1 or 2, wherein the indication included in the response message includes a confirmation that the target UE can use the first synchronization reference source for the sidelink positioning, and further comprising: receiving, at the UE from at least one additional target UE, at least one additional response message including confirmation that the at least one additional target UE can use the first synchronization reference source for sidelink positioning; and using the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning.

Aspect 4. The method of any of Aspects 1 to 3, wherein: the indication included in the response message includes a proposal of a second synchronization reference source associated with the target UE as the master synchronization reference source for the sidelink positioning; and determining whether to use the first synchronization reference source or the different synchronization reference source as the master synchronization reference source includes determining whether the UE can use the second synchronization reference source for the sidelink positioning.

Aspect 5. The method of Aspect 4, further comprising: using the second synchronization reference source as the master synchronization reference source for the sidelink positioning based on determining that the UE can use the second synchronization reference source for the sidelink positioning.

Aspect 6. The method of any of Aspects 4 or 5, wherein determining whether the UE can use the second synchronization reference source for the sidelink positioning is based on whether the UE can wirelessly detect the second synchronization reference source.

Aspect 7. The method of any of Aspects 1 to 6, wherein the indication included in the response message includes a proposal to use the UE as the master synchronization reference source for the sidelink positioning, and further comprising: transmitting, from the UE to the target UE, an additional message including confirmation of the UE as the master synchronization reference source for the sidelink positioning.

Aspect 8. The method of any of Aspects 1 to 7, further comprising: determining, at the UE, that the target UE is a synchronization reference source; and transmitting, from the UE to the target UE, an additional message including a proposal to use the target UE as the master synchronization reference source for the sidelink positioning.

Aspect 9. The method of Aspect 8, further comprising: receiving, at the UE from the target UE, an additional response message including confirmation of the target UE as the master synchronization reference source for the sidelink positioning.

Aspect 10. The method of any of Aspects 1 to 9, wherein the information associated with the first synchronization reference source associated with the UE includes a priority and an address of the first synchronization reference source.

Aspect 11. The method of any of Aspects 1 to 10, wherein the UE is a first vehicle and the target UE is a second vehicle, the first vehicle and the second vehicle being configured to communicate using a cellular-vehicle-to-everything (C-V2X) protocol.

Aspect 12. An apparatus for wireless communications, comprising: at least one memory; and at least one processor coupled to the at least one memory and configured to: transmit, to a target UE, a message including information associated with a first synchronization reference source associated with the apparatus: receive, from the target UE in response to the message, a response message including an indication of whether the target UE can use the first synchronization reference source for sidelink positioning; and determine, based on the response message, whether to use the first synchronization reference source or a different synchronization reference source as a master synchronization reference source for the sidelink positioning.

Aspect 13. The apparatus of Aspect 12, wherein the indication included in the response message includes a confirmation that the target UE can use the first synchronization reference source for the sidelink positioning, and wherein the at least one processor is configured to: use the first synchronization reference source as the master synchronization reference source for the sidelink positioning based on the confirmation in the response message that the target UE can use the first synchronization reference source for the sidelink positioning.

Aspect 14. The apparatus of any of Aspects 12 or 13, wherein the indication included in the response message includes a confirmation that the target UE can use the first synchronization reference source for the sidelink positioning, and wherein the at least one processor is configured to: receive, from at least one additional target UE, at least one additional response message including confirmation that the at least one additional target UE can use the first synchronization reference source for sidelink positioning; and use the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning.

Aspect 15. The apparatus of any of Aspects 12 to 14, wherein: the indication included in the response message includes a proposal of a second synchronization reference source associated with the target UE as the master synchronization reference source for the sidelink positioning; and to determine whether to use the first synchronization reference source or the different synchronization reference source as the master synchronization reference source, the at least one processor is configured to determine whether the apparatus can use the second synchronization reference source for the sidelink positioning.

Aspect 16. The apparatus of Aspect 15, wherein the at least one processor is configured to: use the second synchronization reference source as the master synchronization reference source for the sidelink positioning based on determining that the apparatus can use the second synchronization reference source for the sidelink positioning.

Aspect 17. The apparatus of any of Aspects 15 or 16, wherein the at least one processor is configured to determine whether the apparatus can use the second synchronization reference source for the sidelink positioning based on whether the apparatus can wirelessly detect the second synchronization reference source.

Aspect 18. The apparatus of any of Aspects 12 to 17, wherein the indication included in the response message includes a proposal to use the apparatus as the master synchronization reference source for the sidelink positioning, and wherein the at least one processor is configured to: transmit, to the target UE, an additional message including confirmation of the apparatus as the master synchronization reference source for the sidelink positioning.

Aspect 19. The apparatus of any of Aspects 12 to 18, wherein the at least one processor is configured to: determine that the target UE is a synchronization reference source; and transmit, to the target UE, an additional message including a proposal to use the target UE as the master synchronization reference source for the sidelink positioning.

Aspect 20. The apparatus of Aspect 19, wherein the at least one processor is configured to: receive, from the target UE, an additional response message including confirmation of the target UE as the master synchronization reference source for the sidelink positioning.

Aspect 21. The apparatus of any of Aspects 12 to 20, wherein the information associated with the first synchronization reference source associated with the apparatus includes a priority and an address of the first synchronization reference source.

Aspect 22. The apparatus of any of Aspects 12 to 21, wherein the apparatus is a first vehicle and the target UE is a second vehicle, the first vehicle and the second vehicle being configured to communicate using a cellular-vehicle-to-everything (C-V2X) protocol.

Aspect 23. The apparatus of any of Aspects 12 to 22, wherein the apparatus is configured as a user equipment (UE), and further comprising: a transceiver configured to transmit the message and receive the response message.

Aspect 24. A non-transitory computer-readable medium of a user equipment (UE) having stored thereon instructions that, when executed by one or more processors, cause the one or more processors to: transmit, to a target UE, a message including information associated with a first synchronization reference source associated with the UE: receive, from the target UE in response to the message, a response message including an indication of whether the target UE can use the first synchronization reference source for sidelink positioning; and determine, based on the response message, whether to use the first synchronization reference source or a different synchronization reference source as a master synchronization reference source for the sidelink positioning.

Aspect 25. The non-transitory computer-readable medium of Aspect 24, wherein the indication included in the response message includes a confirmation that the target UE can use the first synchronization reference source for the sidelink positioning, and further comprising instructions that, when executed by the one or more processors, cause the one or more processors to: use the first synchronization reference source as the master synchronization reference source for the sidelink positioning based on the confirmation in the response message that the target UE can use the first synchronization reference source for the sidelink positioning.

Aspect 26. The non-transitory computer-readable medium of any of Aspects 24 to 25, wherein the indication included in the response message includes a confirmation that the target UE can use the first synchronization reference source for the sidelink positioning, and further comprising instructions that, when executed by the one or more processors, cause the one or more processors to: receive, from at least one additional target UE, at least one additional response message including confirmation that the at least one additional target UE can use the first synchronization reference source for sidelink positioning; and use the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning.

Aspect 27. The non-transitory computer-readable medium of any of Aspects 24 to 26, wherein: the indication included in the response message includes a proposal of a second synchronization reference source associated with the target UE as the master synchronization reference source for the sidelink positioning; and to determine whether to use the first synchronization reference source or the different synchronization reference source as the master synchronization reference source, the instructions, when executed by the one or more processors, cause the one or more processors to determine whether the UE can use the second synchronization reference source for the sidelink positioning.

Aspect 28. The non-transitory computer-readable medium of Aspect 27, further comprising instructions that, when executed by the one or more processors, cause the one or more processors to: use the second synchronization reference source as the master synchronization reference source for the sidelink positioning based on determining that the UE can use the second synchronization reference source for the sidelink positioning.

Aspect 29. The non-transitory computer-readable medium of any of Aspects 27 or 28, wherein determining whether the UE can use the second synchronization reference source for the sidelink positioning is based on whether the UE can wirelessly detect the second synchronization reference source.

Aspect 30. The non-transitory computer-readable medium of any of Aspects 24 to 29, wherein the indication included in the response message includes a proposal to use the UE as the master synchronization reference source for the sidelink positioning, and further comprising instructions that, when executed by the one or more processors, cause the one or more processors to: transmit, to the target UE, an additional message including confirmation of the UE as the master synchronization reference source for the sidelink positioning.

Aspect 31. A method for wireless communications at a user equipment (UE), the method comprising: receiving, at the UE from an initiator UE, a message including information associated with a first synchronization reference source associated with the initiator UE; determining whether the UE can use the first synchronization reference source for sidelink positioning; and transmitting, from the UE to the initiator UE in response to the message, a response message including an indication of whether the UE can use the first synchronization reference source as a master synchronization reference source for sidelink positioning.

Aspect 32. The method of Aspect 31, wherein the indication included in the response message includes a confirmation that the UE can use the first synchronization reference source for the sidelink positioning, and further comprising: using the first synchronization reference source as the master synchronization reference source for the sidelink positioning based on the confirmation that the UE can use the first synchronization reference source for the sidelink positioning.

Aspect 33. The method of any of Aspects 31 to 32, wherein the indication included in the response message includes a confirmation that the UE can use the first synchronization reference source for the sidelink positioning, and further comprising: using the first synchronization reference source as the master synchronization reference source for the sidelink positioning based on the confirmation that the UE can use the first synchronization reference source for the sidelink positioning and based on confirmation that at least one additional UE can use the first synchronization reference source for sidelink positioning.

Aspect 34. The method of any of Aspects 31 to 33, wherein determining whether the UE can use the first synchronization reference source for the sidelink positioning is based on whether the UE can wirelessly detect the first synchronization reference source.

Aspect 35. The method of any of Aspects 31 to 34, wherein the indication included in the response message includes a proposal of a second synchronization reference source associated with the UE as the master synchronization reference source for the sidelink positioning, and further comprising: receiving, from the initiator UE, an additional message including confirmation of the second synchronization reference source as the master synchronization reference source for the sidelink positioning.

Aspect 36. The method of Aspect 35, further comprising: using the second synchronization reference source as the master synchronization reference source for the sidelink positioning based on receiving the additional message including the confirmation of the second synchronization reference source as the master synchronization reference source for the sidelink positioning.

Aspect 37. The method of any of Aspects 31 to 36, further comprising: determining, at the UE, that the initiator UE is a synchronization reference source, wherein the indication included in the response message includes a proposal to use the initiator UE as the master synchronization reference source for the sidelink positioning; and receiving, from the initiator UE, an additional message including confirmation of the initiator UE as the master synchronization reference source for the sidelink positioning.

Aspect 38. The method of any of Aspects 31 to 37, further comprising: receiving, from the initiator UE, an additional message including a proposal to use the UE as the master synchronization reference source for the sidelink positioning.

Aspect 39. The method of Aspect 38, further comprising: transmitting, to the initiator UE, an additional response message including confirmation of the UE as the master synchronization reference source for the sidelink positioning.

Aspect 40. The method of any of Aspects 31 to 39, wherein the information associated with a first synchronization reference source associated with the initiator UE includes a priority and an address of the first synchronization reference source.

Aspect 41. The method of any of Aspects 31 to 40, wherein the UE is a first vehicle and the initiator UE is a second vehicle, the first vehicle and the second vehicle being configured to communicate using a cellular-vehicle-to-everything (C-V2X) protocol.

Aspect 42. An apparatus for wireless communications, comprising: at least one memory; and at least one processor coupled to the at least one memory and configured to: receive, from an initiator UE, a message including information associated with a first synchronization reference source associated with the initiator UE: determine whether the apparatus can use the first synchronization reference source for sidelink positioning; and output, to the initiator UE in response to the message, a response message for transmission, the response message including an indication of whether the apparatus can use the first synchronization reference source as a master synchronization reference source for sidelink positioning.

Aspect 43. The apparatus of Aspect 42, wherein the indication included in the response message includes a confirmation that the apparatus can use the first synchronization reference source for the sidelink positioning, and wherein the at least one processor is configured to: use the first synchronization reference source as the master synchronization reference source for the sidelink positioning based on the confirmation that the apparatus can use the first synchronization reference source for the sidelink positioning.

Aspect 44. The apparatus of any of Aspects 42 to 43, wherein the indication included in the response message includes a confirmation that the apparatus can use the first synchronization reference source for the sidelink positioning, and wherein the at least one processor is configured to: use the first synchronization reference source as the master synchronization reference source for the sidelink positioning based on the confirmation that the apparatus can use the first synchronization reference source for the sidelink positioning and based on confirmation that at least one additional UE can use the first synchronization reference source for sidelink positioning.

Aspect 45. The apparatus of any of Aspects 42 to 44, wherein the at least one processor is configured to determine whether the apparatus can use the first synchronization reference source for the sidelink positioning based on whether the apparatus can wirelessly detect the first synchronization reference source.

Aspect 46. The apparatus of any of Aspects 42 to 45, wherein the indication included in the response message includes a proposal of a second synchronization reference source associated with the apparatus as the master synchronization reference source for the sidelink positioning, and wherein the at least one processor is configured to: receive, from the initiator UE, an additional message including confirmation of the second synchronization reference source as the master synchronization reference source for the sidelink positioning.

Aspect 47. The apparatus of Aspect 46, wherein the at least one processor is configured to: use the second synchronization reference source as the master synchronization reference source for the sidelink positioning based on receiving the additional message including the confirmation of the second synchronization reference source as the master synchronization reference source for the sidelink positioning.

Aspect 48. The apparatus of any of Aspects 42 to 47, wherein the at least one processor is configured to: determine that the initiator UE is a synchronization reference source, wherein the indication included in the response message includes a proposal to use the initiator UE as the master synchronization reference source for the sidelink positioning; and receive, from the initiator UE, an additional message including confirmation of the initiator UE as the master synchronization reference source for the sidelink positioning.

Aspect 49. The apparatus of any of Aspects 42 to 48, wherein the at least one processor is configured to: receive, from the initiator UE, an additional message including a proposal to use the apparatus as the master synchronization reference source for the sidelink positioning.

Aspect 50. The apparatus of Aspect 49, wherein the at least one processor is configured to: output, to the initiator UE, an additional response message for transmission, the additional message including confirmation of the apparatus as the master synchronization reference source for the sidelink positioning.

Aspect 51. The apparatus of any of Aspects 42 to 50, wherein the information associated with a first synchronization reference source associated with the initiator UE includes a priority and an address of the first synchronization reference source.

Aspect 52. The apparatus of any of Aspects 42 to 51, wherein the apparatus is a first vehicle and the initiator UE is a second vehicle, the first vehicle and the second vehicle being configured to communicate using a cellular-vehicle-to-everything (C-V2X) protocol.

Aspect 53: At least one non-transitory computer-readable medium containing instructions which, when executed by one or more processors, cause the one or more processors to perform a method according to any of Aspects 1 to 11.

Aspect 54: An apparatus comprising means for performing a method according to any of Aspects 1 to 11.

Aspect 55: At least one non-transitory computer-readable medium containing instructions which, when executed by one or more processors, cause the one or more processors to perform a method according to any of Aspects 31 to 41.

Aspect 56: An apparatus comprising means for performing a method according to any of Aspects 31 to 41.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for wireless communications at a user equipment (UE), the method comprising:
    transmitting, from the UE to a target UE, a message including information associated with a first synchronization reference source associated with the UE;
    receiving, at the UE from the target UE in response to the message, a response message including an indication of whether the target UE can use the first synchronization reference source for sidelink positioning; and
    determining, at the UE based on the response message, whether to use the first synchronization reference source or a different synchronization reference source as a master synchronization reference source for the sidelink positioning, wherein
    the indication included in the response message includes a proposal of a second synchronization reference source associated with the target UE as the master synchronization reference source for the sidelink positioning; and determining whether to use the first synchronization reference source or the different synchronization reference source as the master synchronization reference source includes determining whether the UE can use the second synchronization reference source for the sidelink positioning.

2. The method of claim 1, wherein the indication included in the response message includes a confirmation that the target UE can use the first synchronization reference source for the sidelink positioning, and further comprising:

using the first synchronization reference source as the master synchronization reference source for the sidelink positioning based on the confirmation in the response message that the target UE can use the first synchronization reference source for the sidelink positioning.

3. The method of claim 1, wherein the indication included in the response message includes a confirmation that the target UE can use the first synchronization reference source for the sidelink positioning, and further comprising:

receiving, at the UE from at least one additional target UE, at least one additional response message including confirmation that the at least one additional target UE can use the first synchronization reference source for sidelink positioning; and using the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning.

4. The method of claim 1, further comprising:

using the second synchronization reference source as the master synchronization reference source for the sidelink positioning based on determining that the UE can use the second synchronization reference source for the sidelink positioning.

5. The method of claim 1, wherein determining whether the UE can use the second synchronization reference source for the sidelink positioning is based on whether the UE can wirelessly detect the second synchronization reference source.

6. The method of claim 1, wherein the indication included in the response message includes a proposal to use the UE as the master synchronization reference source for the sidelink positioning, and further comprising:

transmitting, from the UE to the target UE, an additional message including confirmation of the UE as the master synchronization reference source for the sidelink positioning.

7. The method of claim 1, further comprising:

determining, at the UE, that the target UE is a synchronization reference source; and transmitting, from the UE to the target UE, an additional message including a proposal to use the target UE as the master synchronization reference source for the sidelink positioning.

8. The method of claim 7, further comprising:

receiving, at the UE from the target UE, an additional response message including confirmation of the target UE as the master synchronization reference source for the sidelink positioning.

9. The method of claim 1, wherein the information associated with the first synchronization reference source associated with the UE includes a priority and an address of the first synchronization reference source.

10. The method of claim 1, wherein the UE is a first vehicle and the target UE is a second vehicle, the first vehicle and the second vehicle being configured to communicate using a cellular-vehicle-to-everything (C-V2X) protocol.

11. An apparatus for wireless communications, comprising:

at least one memory; and at least one processor coupled to the at least one memory and configured to:

transmit, to a target UE, a message including information associated with a first synchronization reference source associated with the apparatus;

receive, from the target UE in response to the message, a response message including an indication of whether the target UE can use the first synchronization reference source for sidelink positioning; and determine, based on the response message, whether to use the first synchronization reference source or a different synchronization reference source as a master synchronization reference source for the sidelink positioning, wherein the indication included in the response message includes a proposal of a second synchronization reference source associated with the target UE as the master synchronization reference source for the sidelink positioning; and to determine whether to use the first synchronization reference source or the different synchronization reference source as the master synchronization reference source, the at least one processor is configured to determine whether the apparatus can use the second synchronization reference source for the sidelink positioning.

12. The apparatus of claim 11, wherein the indication included in the response message includes a confirmation that the target UE can use the first synchronization reference source for the sidelink positioning, and wherein the at least one processor is configured to:

use the first synchronization reference source as the master synchronization reference source for the sidelink positioning based on the confirmation in the response message that the target UE can use the first synchronization reference source for the sidelink positioning.

13. The apparatus of claim 11, wherein the indication included in the response message includes a confirmation that the target UE can use the first synchronization reference source for the sidelink positioning, and wherein the at least one processor is configured to:

receive, from at least one additional target UE, at least one additional response message including confirmation that the at least one additional target UE can use the first synchronization reference source for sidelink positioning; and use the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning.

14. The apparatus of claim 11, wherein the at least one processor is configured to:
  use the second synchronization reference source as the master synchronization reference source for the sidelink positioning based on determining that the apparatus can use the second synchronization reference source for the sidelink positioning.

15. The apparatus of claim 11, wherein the at least one processor is configured to determine whether the apparatus can use the second synchronization reference source for the sidelink positioning based on whether the apparatus can wirelessly detect the second synchronization reference source.

16. The apparatus of claim 11, wherein the indication included in the response message includes a proposal to use the apparatus as the master synchronization reference source for the sidelink positioning, and wherein the at least one processor is configured to:
  transmit, to the target UE, an additional message including confirmation of the apparatus as the master synchronization reference source for the sidelink positioning.

17. The apparatus of claim 11, wherein the at least one processor is configured to:
  determine that the target UE is a synchronization reference source; and
  transmit, to the target UE, an additional message including a proposal to use the target UE as the master synchronization reference source for the sidelink positioning.

18. The apparatus of claim 17, wherein the at least one processor is configured to:
  receive, from the target UE, an additional response message including confirmation of the target UE as the master synchronization reference source for the sidelink positioning.

19. The apparatus of claim 11, wherein the information associated with the first synchronization reference source associated with the apparatus includes a priority and an address of the first synchronization reference source.

20. The apparatus of claim 11, wherein the apparatus is a first vehicle and the target UE is a second vehicle, the first vehicle and the second vehicle being configured to communicate using a cellular-vehicle-to-everything (C-V2X) protocol.

21. The apparatus of claim 11, wherein the apparatus is configured as a user equipment (UE), and further comprising:
  a transceiver configured to transmit the message and receive the response message.

22. A non-transitory computer-readable medium of a user equipment (UE) having stored thereon instructions that, when executed by one or more processors, cause the one or more processors to:
  transmit, to a target UE, a message including information associated with a first synchronization reference source associated with the UE;
  receive, from the target UE in response to the message, a response message including an indication of whether the target UE can use the first synchronization reference source for sidelink positioning; and
  determine, based on the response message, whether to use the first synchronization reference source or a different synchronization reference source as a master synchronization reference source for the sidelink positioning, wherein
    the indication included in the response message includes a proposal of a second synchronization reference source associated with the target UE as the master synchronization reference source for the sidelink positioning; and
  to determine whether to use the first synchronization reference source or the different synchronization reference source as the master synchronization reference source, the instructions, when executed by the one or more processors, cause the one or more processors to determine whether the UE can use the second synchronization reference source for the sidelink positioning.

23. The non-transitory computer-readable medium of claim 22, wherein the indication included in the response message includes a confirmation that the target UE can use the first synchronization reference source for the sidelink positioning, and further comprising instructions that, when executed by the one or more processors, cause the one or more processors to:
  use the first synchronization reference source as the master synchronization reference source for the sidelink positioning based on the confirmation in the response message that the target UE can use the first synchronization reference source for the sidelink positioning.

24. The non-transitory computer-readable medium of claim 22, wherein the indication included in the response message includes a confirmation that the target UE can use the first synchronization reference source for the sidelink positioning, and further comprising instructions that, when executed by the one or more processors, cause the one or more processors to:
  receive, from at least one additional target UE, at least one additional response message including confirmation that the at least one additional target UE can use the first synchronization reference source for sidelink positioning; and
  use the first synchronization reference source as the master synchronization reference source for the sidelink positioning based on the confirmation that the target UE can use the first synchronization reference source for the sidelink positioning and based on the confirmation that the at least one additional target UE can use the first synchronization reference source for sidelink positioning.

25. The non-transitory computer-readable medium of claim 22, further comprising instructions that, when executed by the one or more processors, cause the one or more processors to:
  use the second synchronization reference source as the master synchronization reference source for the sidelink positioning based on determining that the UE can use the second synchronization reference source for the sidelink positioning.

26. The non-transitory computer-readable medium of claim 22, wherein determining whether the UE can use the second synchronization reference source for the sidelink positioning is based on whether the UE can wirelessly detect the second synchronization reference source.

27. The non-transitory computer-readable medium of claim 22, wherein the indication included in the response message includes a proposal to use the UE as the master synchronization reference source for the sidelink positioning, and further comprising instructions that, when executed by the one or more processors, cause the one or more processors to:
- transmit, to the target UE, an additional message including confirmation of the UE as the master synchronization reference source for the sidelink positioning.

* * * * *